United States Patent [19]

Mishina et al.

[11] Patent Number: 5,800,939

[45] Date of Patent: Sep. 1, 1998

[54] BATTERY AND METHOD FOR THE MANUFACTURE OF SUCH A BATTERY

[75] Inventors: Shinya Mishina, Kawasaki; Soichiro Kawakami; Naoya Kobayashi, both of Nara; Masaya Asao, Tsuzuki-gun, all of Japan

[73] Assignee: Canon Kabushiki Kaisha, Tokyo, Japan

[21] Appl. No.: 515,532

[22] Filed: Aug. 15, 1995

[30] Foreign Application Priority Data

Aug. 23, 1994 [JP] Japan .................................. 6-198846

[51] Int. Cl.⁶ .................................................. H01M 2/12
[52] U.S. Cl. ........................... 429/57; 429/62; 429/171
[58] Field of Search .................................. 429/54, 62, 7, 429/122, 57, 55, 56, 59, 171, 174; 29/623.1

[56] References Cited

U.S. PATENT DOCUMENTS

| | | | |
|---|---|---|---|
| 4,975,341 | 12/1990 | Tucholski et al. | 429/62 |
| 4,992,339 | 2/1991 | Georgopoulos | 429/7 |
| 5,188,909 | 2/1993 | Pedicini | 429/7 |
| 5,376,467 | 12/1994 | Abe et al. | 429/7 |
| 5,418,084 | 5/1995 | Georgopoulos | 429/54 |

FOREIGN PATENT DOCUMENTS

| | | |
|---|---|---|
| 0336102 | 10/1989 | European Pat. Off. . |
| 0536425 | 4/1993 | European Pat. Off. ....... H01M 10/40 |
| 60-198051 | 3/1984 | Japan . |

OTHER PUBLICATIONS

Patent Abstracts of Japan, vol. 10 No. 42 (E-382), Feb. 1986 & JP-A-60 198051 (Matsushita Denki Sangyo KK).
Patent Abstracts of Japan, vol. 8 No. 131 (E-251), Jun. 19, 1984 & JP-A-59 042761 (Shinkoube Denki KK).
Patent Abstracts of Japan, vol. 16 No. 521 (E-1285), Oct. 27, 1992 & JP-A-04 196063 (Shin Kobe Electric Mach Co).
Patent Abstracts of Japan, vol. 9 No. (E-288), Jan. 10, 1985 & JP-A-59 154756 (Yuasa Denchi KK).
Patent Abstracts of Japan, vol. 12 No. 447 (E-685), Nov. 1988 & JP-A-63 175345 (Matsushita Electric Ind Co).
Patent Abstracts of Japan, vol. 14 No. 394 (E-0969), Aug. 1990 & JP-A-02 148577 (Matsushita Electric Ind Co).
Patent Abstracts of Japan, vol. 9 No. 159 (E-326), Jul. 4, 1985 & JP-A-60 037675 (Kogyo Gijutsuin).

*Primary Examiner*—M. Nuzzolillo
*Attorney, Agent, or Firm*—Fitzpatrick, Cella, Harper & Scinto

[57] ABSTRACT

The object of the present invention is to provide a secondary battery that has a lamination of negative electrodes and positive electrodes with intervening separators that acquires a low battery internal impedance and excellent charging and discharging power by the sufficient compressing of the electrodes, and that is very safe and easy to recycle, and to provide a method for manufacturing such a battery. To achieve the above object, according to the present invention, in a battery wherein positive electrodes and negative electrodes are disposed with intervening separators, and are stored in a battery housing with a solid electrolyte or an electrolyte solution, provided in the battery housing is a member whose shape is changed at a predetermined temperature (first temperature), which is lower than the melting point of the separator that maintains the shape in the battery operating temperature range. By heating or cooling the member to the first temperature, pressure is applied to at least one part of the battery housing or the applied pressure is released.

52 Claims, 14 Drawing Sheets

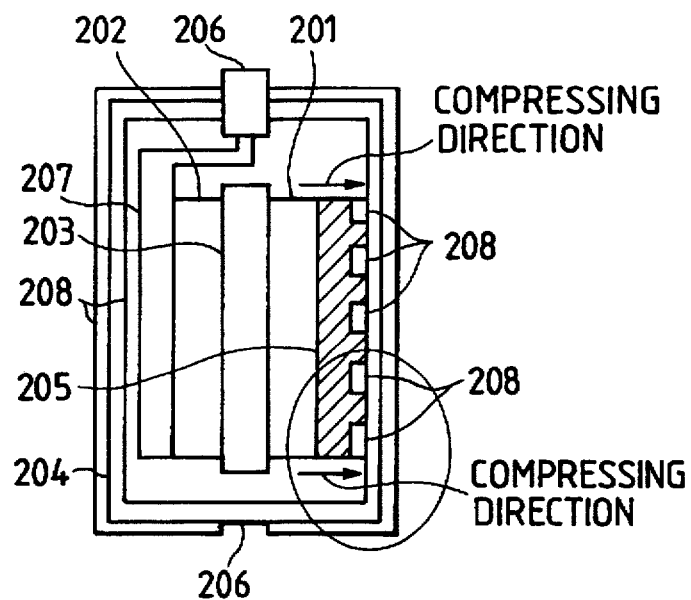
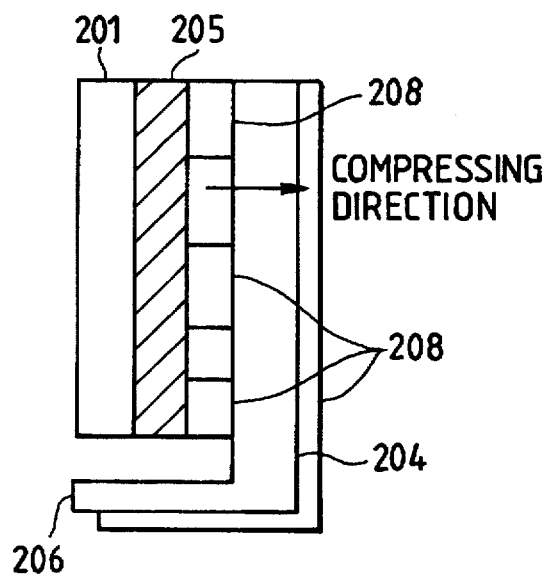 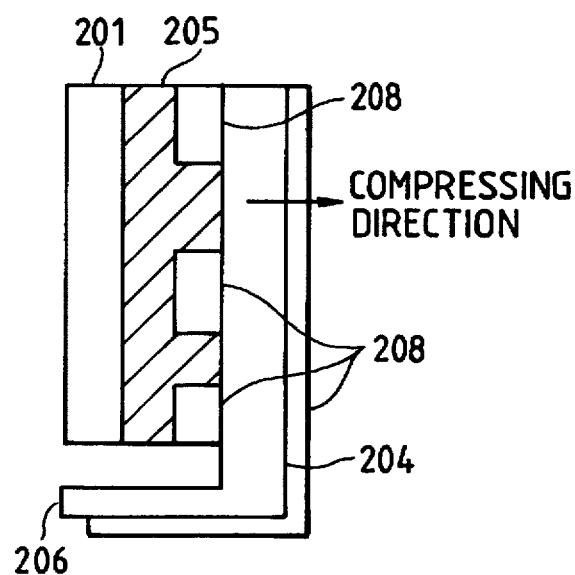

BATTERY AND METHOD FOR THE MANUFACTURE OF SUCH A BATTERY

BACKGROUND OF THE INVENTION

1. Field of the Invention

The present invention relates to a cell in which the negative electrode and the positive electrode are located with an intervening separator, and that is inserted into a battery case. In particular, the present invention relates to a battery for which a member whose shape is changed due to temperature, and that holds the shape, is employed to increase a high discharge capacity, to improve reliability, and to facilitate recycling.

2. Related Background Art

Currently, concurrently with the development of portable electronic devices, there is an increased demand for higher performance power sources (batteries), which serve as the cores that drive such electronic devices. In addition, with respect to environmental problems on earth, there are increased demands that there be developed a secondary battery that has a high energy density for load leveling and for electronic cars, and that used batteries be collected and recycled, so that the need for thermal power generation, during which $CO_2$, etc., are discharged, can be reduced and excessive power is evened out.

As one type of high performance battery, there has been actively developed a lithium ion secondary battery of a locking chair type wherein an intercalation compound, into which lithium ions are intercalated is employed for a positive electrode and carbon is employed as an active negative electrode material. This battery is being used partially in practice for an 8-mm video camera and a portable telephone. Since the lithium ion secondary battery does not have the energy density that metallic lithium has originally, a lithium secondary battery is also being actively studied that can achieve high energy density, which is the original characteristic of lithium, by employing metallic lithium as an active negative electrode material.

Generally, for a lithium secondary battery (here the one where lithium ions take part in the cell reaction is collectively called a lithium battery), a nonaqueous electrolyte solution is used to suppress the reaction of metallic lithium with water. The nonaqueous electrolyte solution of the lithium secondary battery has lower electrolytic dissociation and more inferior ion mobility than those in a nickel-cadmium secondary battery and those in a lead secondary battery for which an aqueous electrolyte solution is employed. Thus, the electric conductivity of the electrolyte solution is low and the internal impedance of the battery becomes greater, so that the distance between the negative and the positive electrodes must be short to reduce the internal impedance of the battery.

For this reason, a method has been considered that reduces an internal impedance of a battery by decreasing the distance between a negative and a positive electrode. More specifically, the method is performed as follows. For the electrode winding structure (spiral type) wherein a negative and a positive electrode are provided by winding via a separator, the negative electrode and the positive electrode are compressed by winding with tension while the structure is inserted into a battery housing.

As is shown in FIGS. 17A and 17B, a rectangular battery has the electrode structure of a single layer (FIG. 17A) or of a plurality of layers (FIG. 17B). Reference number 1701 denotes a negative electrode; 1702, a positive electrode; and 1703, each separator.

When the electrode structure where negative electrodes and positive electrodes are overlaid via separators is to be inserted in a battery housing, as is shown in FIGS. 18A through 18C, the electrodes are pressed in a compressing direction by an external force. In FIGS. 18A through 18C, reference number 1801 denotes a negative electrode; 1802, a positive electrode; 1803, a separator; 1804, a battery housing; and 1805, means for externally compressing the electrodes. That is, to insert the electrodes into the battery case, as is shown in FIG. 18A, part of the electrodes are inserted while being compressed by an external force, after this the external compression pressure that is applied to the electrodes is released (FIG. 18B) and the electrodes are either driven in the remaining distance by an external force or by vibration (FIG. 18C), and a battery is thus provided. In the state shown in FIG. 18A, the distal portions of the electrodes are free and are not being compressed, and therefore the electrodes for the battery in FIG. 18C, which is provided by the process shown in FIG. 18B, are not sufficiently compressed.

In other words, by the above described method, pressure can not be applied to the electrodes as a whole, and the distance between the negative electrodes and the positive electrodes is increased. Thus impedance is high, it is difficult for cell reaction to occur, and energy loss inside the battery is increased. As a result, the charge/discharge capacity is a smaller value than that which should naturally be obtained, and the coefficient of the use of an active battery material is reduced.

In addition, for an above described battery that has a large capacity for load leveling and for electronic cars, the electrode areas must be larger. Thus, in addition to a spiral type that is primarily employed currently, such an electrode structure has been considered wherein negative electrodes and positive electrodes are laminated with a separator. As the electrode areas are increased, to improve the battery performance it becomes more important for relatively opposite electrodes to be compressed uniformly and for the impedance to be reduced as much as possible. An effective compression means is therefore strongly demanded.

Further, since a lithium secondary battery employs an organic solvent as its electrolyte solution, preferably, it should be treated very carefully and a safety valve must be provided for the battery.

The safety valve is so structured that it is opened when a flexible member, such as a spring or rubber, is driven as the internal pressure is raised. In other words, the safety valve is actuated after a certain period of time has elapsed in the excitation of the performance of the battery. For a larger battery, it is preferable that such a mechanism be improved more. Thus, there is a demand for a mechanism that performs detection and is activated before the internal pressure is raised.

During the processing of used batteries that are collected in order for the battery material to be recycled, it is not easy to cut away the battery housing and to extract the battery components, such as the electrodes that while under compression are stored within the battery housings and adjacent to the internal surfaces of the battery housing walls. Thus, there is a demand for a means that, during the recycling processing of the used batteries that are collected, makes it possible to easily separate from the battery housing the battery components that are positioned adjacent to the internal surfaces of the battery housing walls.

SUMMARY OF THE INVENTION

To overcome the above described shortcomings, it is a first object of the present invention to provide a battery, wherein negative electrodes and positive electrodes are arranged via separators, that has a low internal impedance and a high charge/discharge performance that are obtained by adequately compressing positive and negative electrodes.

It is a second object of the present invention to provide a battery that possesses means for reducing internal pressure in consonance with the internal temperature of the battery.

It is a third object of the present invention to provide a battery that can be easily recycled.

It is a fourth object of the present invention to provide a method for manufacturing a battery that involves simple procedures and that enables good yields.

To solve the aforementioned problems, the present inventors studied them carefully and then devised the following invention.

According to the present invention, a battery is so designed that positive electrodes and negative electrodes, which are disposed with intervening separators, are stored in a battery housing, along with a solid electrolyte or an electrolyte solution, wherein is provided a component whose shape is altered at a predetermined temperature (a first temperature), which is lower than a melting point of the separators and that, while retaining the altered shape at temperatures that fall within the operating temperature range, is heated to the first temperature to exert pressure in at least one area within the battery housing or is cooled to release the exerted pressure.

The negative electrodes contain at least lithium as an active material, and a nonaqueous solution is employed as the electrolytic solution.

The negative electrodes and the positive electrodes are fixed to a negative collector and a positive collector, respectively, and are connected to input and output terminals of the negative and the positive collectors.

A battery of the present invention further comprises an elastic body and stopper means for suppressing elastic force of the elastic body, with the stopper means being constituted by the member.

According to the present invention, as the shape of the member is altered, pressure is exerted in a direction in which a distance between the positive electrodes and the negative electrodes is reduced, a safety valve that is provided for the battery housing is actuated, and/or the positive electrodes (or the positive collector) become electrically connected to the input/output terminals for positive electrodes and/or the negative electrodes (or the negative collector) become electrically connected to the input/output terminals for negative electrodes.

According to the present invention, it is preferable that the member be formed of an alloy or a resin that has a shape-memory function. Especially, for easy handling, it is desirable that the member be formed of a shape-memory alloy. Alternatively, the member may be made of a material whose volume is expanded at the first temperature. Preferably, the material will generate a gas as its volume is expanded.

In a battery of the present invention, it is preferable that the member be a made of material that assumes an altered shape at the first temperature and then altered shape at a second temperature that falls outside the operating temperature range.

For example, the member may be made of a material that assumes one shape at the first temperature and that then assumes a different shape at the second temperature that falls outside the operating temperature range. Due to the change in the shape of the member at the second temperature, pressure that is exerted in a direction opposite to the electrodes is released, or the actuation of the safety valve that is provided in the battery housing ceases. Or, due to the change in the shape at the second temperature, the electric connection of the positive electrodes (or the positive collector) to the input/output terminals for positive electrodes is interrupted, and/or the electric connection of the negative electrodes (or the negative collector) to the input/output terminals for negative electrodes is interrupted.

Further, a member is provided that is different from a member that effects an electrical connection or a disconnection for the input terminals and the electrodes and that actuates the safety valve, and a temperature at which the safety valve is actuated is raised so that it is higher than a temperature (the second temperature) at which the electrical connection is interrupted.

The altered shapes that the member assumes at the first temperature and at the second temperature are reversible.

In addition, it is preferable that a battery of the present invention comprise compression uniformizing means for the uniform exertion of pressure. Preferably, the compression uniformizing means is made of a material that acquires a state of flowability at a temperature that is lower than a melting point of the separators, and that does not react, or is processed so as not to react, with the solid electrolyte and the electrolyte solution. Especially, it is desirable that the compression uniformizing means be located between the member and the electrodes in the battery housing.

A method, according to the present invention, for manufacturing a secondary battery,. wherein positive electrodes and negative electrodes are disposed with intervening separators and such a resultant structure is stored in a battery housing, along with a solid electrolyte or an electrolyte solution, comprises the steps of:

storing, in the battery housing, at least the positive electrodes, the negative electrodes, the separators, and a member whose shape is altered at a temperature (a first temperature) that is lower than a melting point of the separators and that falls outside an operating temperature range of the battery, and that retains the altered shape at temperatures that fall within the operating temperature range; and heating or cooling a resultant structure at the first temperature that differs from a temperature that exists at such time as storing is accomplished.

A method of the present invention for manufacturing a secondary battery further comprises the step of providing compression uniformizing means in the member.

It is preferable that negative electrodes that contain lithium as an active material charging upon operation be employed as the negative electrodes, that a nonaqueous electrolyte solution be employed as the electrolytic solution, and that production procedures be performed in an atmosphere that provides for adequate removal of water.

A battery according to the present invention is so designed that the positive electrodes and the negative electrodes are disposed with intervening separators, and the resultant structure is stored in a battery housing, along with a solid electrolyte and an electrolyte solution, and that, in the battery housing, a member (e.g., a shape-memory alloy) is provided whose shape is altered at a temperature (a first temperature) that is lower than a melting point of the separators and that falls outside an operating temperature range of the battery, and that retains the altered shape at temperatures that fall within the operating temperature range. When the member is heated at a predetermined temperature (the first temperature) or cooled, the shape of the member can be varied. Therefore, as the shape of the member is set at the predetermined temperature, the shape of the member is changed and the electrodes, for example, can be compressed by a force that operates perpendicular to the surfaces of the electrodes. The internal impedance of the battery is then reduced, so that a battery with excellent charging and discharging properties can be provided.

As the above described member for which the shape varies in consonance with the temperature, a member that not only changes in shape at the first temperature but also at the second temperature is employed. For example, with a member that has a shape which is altered at the first temperature for the application of pressure and which is altered at the second temperature for the release of pressure, the pressure on the electrodes is released when the temperature is set to the second temperature, enabling the electrodes to be easily removed at the time the batteries are collected for recycling or reproducing.

Further, when material, such as wax that can assume a state of flowability, is employed as the compression equalization means, that material evens out the raised and recessed portions on the surfaces of the electrodes so that pressure can be uniformly applied to the electrodes by a member whose shape is altered by temperature. Thus, the size (area) of the electrodes can be easily increased.

BRIEF DESCRIPTION OF THE DRAWINGS

FIGS. 3A through 3C are conceptual diagrams illustrating another mechanism wherein the member whose shape is varied by temperature electrically connects an input/output terminal for a positive electrode to the positive electrode in the battery, and/or electrically connects an input/output terminal for a negative electrode to the negative electrode in the battery;

DETAILED DESCRIPTION OF THE PREFERRED EMBODIMENTS

The operation of the present invention, together with the preferred embodiments, will now be described in detail.

<Member whose shape is varied by temperatures>

A member, employed in this invention, that is varied in shape by temperature is defined as a member whose shape is changed by raising it to a predetermined temperature (a first temperature) and that retains its changed shape within a practical temperature range of a battery. Because a member that resumes its original shape in the operating temperature range can not hold a permanent function.

It is preferable that a general-purpose battery be useable within a temperature range of from a temperature (−30° C.) in cold areas to a temperature (80° C.) in a closed car in the daytime, and a member that can maintain its altered shape in this temperature range. When a battery is used at a location where the temperature range is limited, only a member that is appropriate for the operating temperature range at that location need be employed.

For a secondary battery of this embodiment, a member whose shape is varied at a temperature that is lower than the melting point for a separator must be selected. If the shape of a member is not altered unless the temperature is higher than the melting point of the separator, the separator will melt before the objective performance is attained, the transfer of an active material between the negative electrode and the positive electrode will be interrupted, the internal impedance of the battery will be extremely increased, and the effect of the present invention will not be fully obtained.

By employing a member whose shape is varied by temperature, the following functions can be added to the battery of the present invention: First, a function for applying pressure to the electrodes in the battery to the face opposite perpendicular to the electrodes; second, a function for electrically connecting input/output terminals of the battery to the electrodes; third, a function for disconnecting the input/output terminals of the battery from the electrodes and for cutting off a current flow, in consonance with the internal temperature of the battery, to prevent in advance an increase in the internal temperature of the battery; fourth, a function for, in consonance with the temperature, controlling the actuation of a safety valve that is provided in a battery housing; and fifth, a function for easily removing members, such as the electrodes, from the battery housing when the battery is disassembled to further facilitate recycling.

These functions of a member in a battery case whose shape is altered by temperature will be described in detail.

(1) Compression to electrodes

An explanation will be given of a mechanism according to the present invention wherein a member in a battery housing whose shape is altered by temperature compresses the electrodes in the battery housing perpendicular to the electrode surfaces.

Figure 1A:
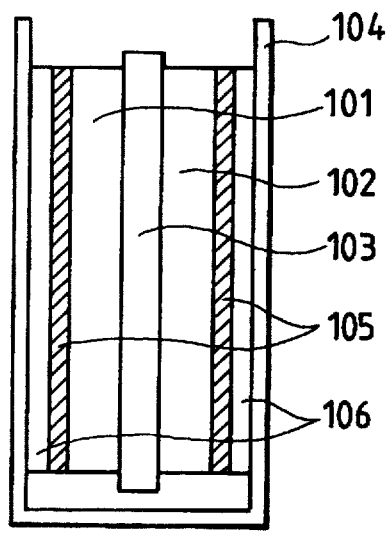
FIGS. 1A and 1B are conceptual diagrams illustrating a mechanism in which a member whose shape is varied by temperature applies pressure to electrodes in a battery.
Figure 1B:
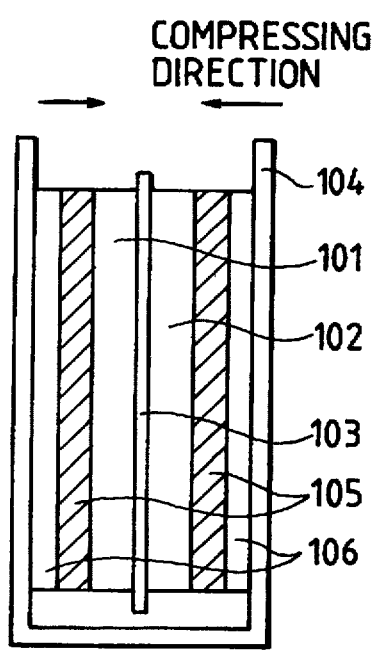

FIGS. 1A and 1B, schematic cross sectional views of a battery, are employed to explain why a member whose shape is varied by temperature can compress electrodes in a battery case in a direction that is perpendicular to the electrode surfaces. In FIGS. 1A and 1B, reference number 101 denotes a negative electrode; 102, a positive electrode; 103, a separator; 104, a battery housing; 105, a member whose shape is varied by temperature; and 106, an insulator.

In a secondary battery of the present invention, as is shown in FIG. 1A, for example, with the negative electrode 101 and the positive electrode 102 facing each other with the separator 103 intervening, the electrodes and the member 105 whose shape is varied at a desired temperature are inserted into the battery housing 104. This is the state before the shape of the member 105 has been altered. The structure in this state (i.e., where the electrodes 101 and 102 and the member 105 are inserted into the battery housing 104) is then heated to a temperature (first temperature) at which the shape of the member 105 is altered or to a higher temperature. As is shown in FIG. 1B, the shape of the member 105 is altered and the distance between the electrodes is reduced. As a result, the electrodes are adequately compressed in the battery housing in a direction that is perpendicular to the faces of the electrodes.

In addition, when a member that has a reversible change of the shape is employed as the member 105 whose shape is varied by temperature, the shape is altered again at a temperature (second temperature) that falls outside the operating temperature range of a battery, and the compression is released. Thus, a function for easily removing the electrodes from the battery housing when the battery is disassembled can be provided.

(2) Electric connection and disconnection of input/output terminals of a battery and electrodes An explanation will be given for a function wherein a member whose shape is altered at the first temperature electrically connects an input/output positive electrode terminal of a battery to a positive electrode in the battery and/or connects an input/output negative electrode terminal of the battery to a negative electrode in the battery.

The member whose shape is varied by temperature not only serves as compression means for the electrodes but also causes the input/output terminals of the battery to be electrically connected to the electrodes. In other words, by applying pressure to the electrodes, electrode leads (battery input/output terminals) can be electrically connected to the electrodes in the battery.

Figure 2A:
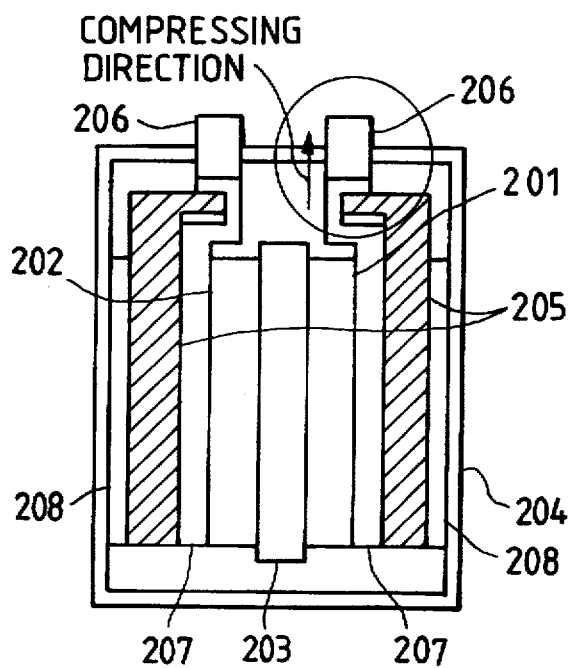
FIGS. 2A through 2C are conceptual diagrams illustrating a mechanism wherein the member whose shape is varied by temperature electrically connects an input/output terminal for a positive electrode to the positive electrode in the battery, and/or electrically connects an input/output terminal for a negative electrode to the negative electrode in the battery.
Figure 2B:
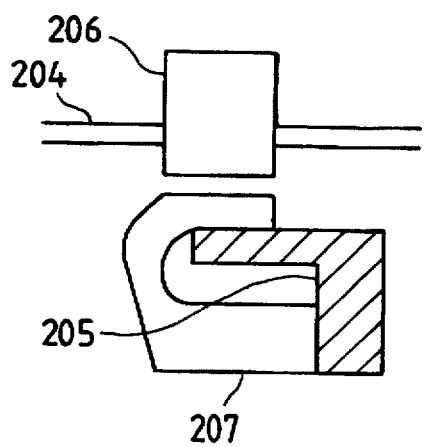
Figure 2C:
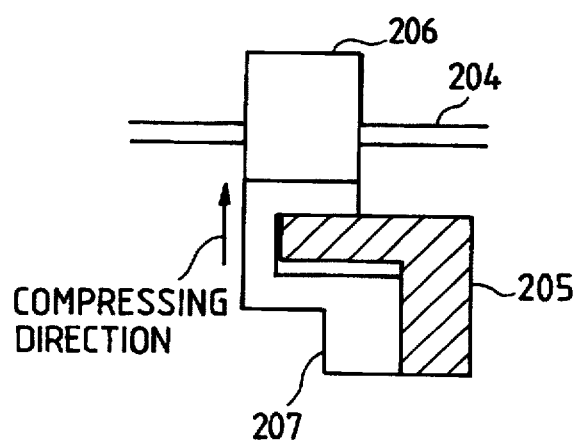

The above function will be specifically described while referring to FIG. 2, but the present invention is not limited to the following example. FIGS. 2A through 2C, schematic cross sectionals view of a battery, are used to explain the structure of a battery wherein a member whose shape is varied by temperature is employed as means for electrically connecting the battery input/output terminal for a positive electrode to the positive electrode in the battery, and for electrically connecting the battery input/output terminals for a negative electrode to the negative electrode in the battery. In FIGS. 2A through 2C, reference number 201 denotes a negative electrode; 202, a positive electrode; 203, a separator; 204, a battery housing; 205, a member whose shape is varied by temperature; 206, battery input/output terminals; 207, a tap for leading electrodes; and 208, an insulator.

According to the present invention, the structure shown in FIG. 2, for example, is employed to perform, by compression, electric connection between the battery input/output terminal for a positive electrode and the positive electrode in the battery and between the battery input/output terminal for a negative electrode and the negative electrode in the battery. FIGS. 2B and 2C are specific enlarged diagrams showing the states, before and after the pressure is applied, of a portion (enclosed by a circle) where electric contact is made by applying pressure in FIG. 2A.

In FIG. 2B, a diagram that shows the state before pressure is applied, a gap exists between the electrode lead tab 207 in the battery and the corresponding battery input/output terminal 206 and electric contact is cut off. In the state shown in FIG. 2C, where the shape of the member 205 whose shape is varied by temperature has been altered by heating, pressure is applied to the electrode lead tab 207 that corresponds to the battery input/output terminal 206 as a result of the change in the shape of the member 205, and adequate electric contact between the electrode in the battery and the corresponding battery input/output terminal is provided.

Therefore, sufficient pressure is applied to the contact areas of the electrode lead tabs that correspond to the electrodes in the battery, while the electrodes in the battery are compressed in a direction that is perpendicular to the faces of the electrodes, to provide adequate current collection.

In this instance, it is preferable that a coating of a soft conductive material, such as gold, silver, indium or solder, be applied to the contact areas of the electrode lead terminals 206 that contact the electrodes in the battery, the lead tabs 207, or the compression means to obtain a desirable electric contact.

As is described above, according to the present invention, electrical connection can be provided between the battery input/output terminal for a positive electrode and the positive electrode in the battery, and/or between the battery input/output terminal for a negative electrode and the negative electrode in the battery, without conventional means, such as soldering and spot welding, being employed.

Figure 4A:
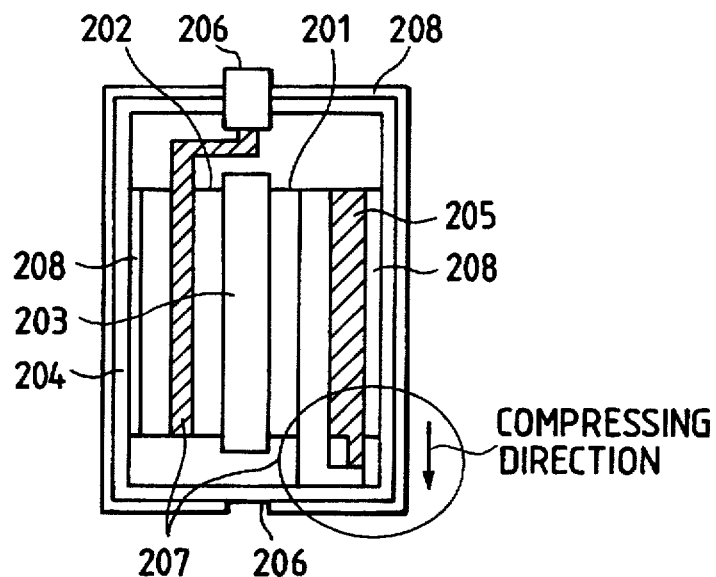
FIGS. 4A through 4C are conceptual diagrams illustrating an additional mechanism wherein the member whose shape is varied by temperature electrically connects an input/output terminal for a positive electrode to the positive electrode in the battery, and/or electrically connects an input/output terminal for a negative electrode to the negative electrode in the battery.

In addition, as is shown in FIGS. 3A and 4A, the present invention can be employed effectively when one of battery input/output terminals also serves as a battery housing. In FIG. 3A, a shape-memory alloy, etc., that can conduct electrically is employed as the member 205 whose shape is varied by temperatures. An electrode lead tab is not required, and a battery input/output terminal (battery case) 206 is electrically connected to one of the electrodes by utilizing an event during which the electrodes in a battery are compressed not only in a direction that is perpendicular to the faces of the electrodes, but also toward the internal face of the battery housing (indicated by the arrow in FIG. 3A). In the case shown in FIG. 4A, an electrode lead tab 207 is employed to electrically connect one of the electrodes in the battery to the battery input/output terminal (battery housing) 206. In this instance, the other electrode must be insulated from the battery case.

Figure 4B:
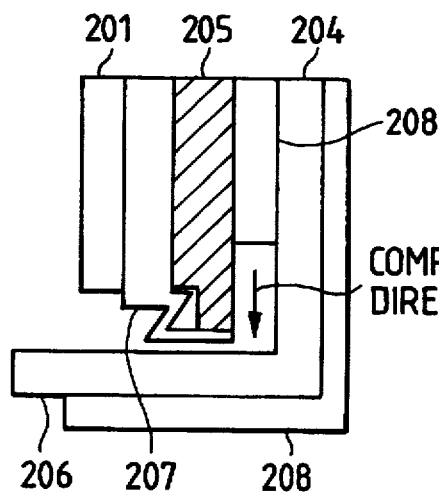
Figure 4C:
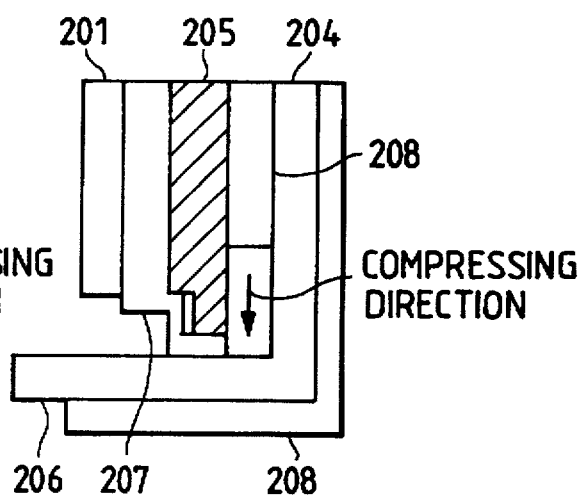

FIGS. 3B and 3C, and FIGS. 4B and 4C are enlarged diagrams of the portions (enclosed by circles) in FIGS. 3A and 4A, respectively, in which electric connections are made. FIGS. 3B and 4B are diagrams showing the states before pressure has been applied, while FIGS. 3C and 4C are diagrams showing the states after pressure has been applied. In the states shown in FIGS. 3B and 4B before pressure has been applied, as well as in FIG. 2B, gaps exist between the battery input/output terminals and either the members whose shapes are changed by temperature or the electrode lead tab, and electrical contact is cut off. In the states shown in FIGS. 3C and 4C after pressure has been applied, as well as in FIG. 2C, the shapes of the members whose shapes are varied by temperature are altered and the battery input/output terminals are fully connected electrically to those members or to the electrode lead tab by compression. In other words, the present invention is also effective when one of the battery input/output terminals for the electrodes also serves as a battery housing.

Further, according to the present invention, since with a simple structure for the battery components at least one part of the battery can be set to a predetermined temperature, electric connection between the battery input/output terminal for a positive electrode to the positive electrode in the battery and/or between the battery input/output terminal for a negative electrode and the negative electrode in the battery. Therefore, since means, such as spot welding or soldering, is not required as in a conventional case, a battery manufacturing process can be simplified, and since the electrodes are connected to the battery input/output terminals only by the pressure that is exerted as the result of a thermal process, the electrodes can be easily removed from the battery housing when the battery is disassembled.

In addition, to prevent a temperature rise, a function can be provided to reverse the shape altering process and enable another shape to be assumed at a second temperature (e.g., a higher temperature) that falls outside the operating temperature range for a battery, so that pressure is released, a gap appears between the battery input/output terminal for a positive electrode and a positive electrode in the battery and/or between the battery input/output terminal for a negative electrode and the negative electrode in the battery (see FIGS. 2B, 3B, and 4B), and current flow is interrupted by the electrical contact being broken.

More specifically, when heat is generated by overcharging, overdischarging, or an internal short-circuit, and the internal temperature of the battery rises higher than the second temperature, the use (charging and discharging) of the battery is halted. Therefore, the occurrence of problems that are associated with overcharging and overdischarging (adverse influences on other batteries that are connected in series) can be prevented.

When a member is employed for which shape altering process is reversible, such a function can also be provided by which, when the temperature is reduced, pressure is applied to the contact area of the electrode, the battery input/output terminal and the lead tab are again electrically connected, and the original, normal state is automatically resumed.

(3) Safety valve for sensing the temperature in a cell

An explanation will now be given for a function of the present invention by which at a desired temperature a member whose shape is varied by temperature controls the actuation of a safety valve.

According to the present invention, it is possible to automatically control the actuation of a safety valve in consonance with a battery temperature. More specifically, it is possible to provide a lithium secondary battery that for greater operating safety actuates a safety valve in consonance with the internal temperature of the battery before the internal pressure of the battery is raised.

Such a function will be specifically described while referring to FIGS. 5A through 5D and 6A through 6C. FIGS. 5A through 5D and 6A through 6C are schematic cross sectional views of a battery and are used to explain the principle by which a safety valve is actuated at a desired temperature. Reference number 501 denotes a negative electrode; 502, a positive electrode; 503, a separator; 504, a battery housing; 505, an elastic body, such as a spring or rubber; 506, a sealing plate; 507, a safety valve; 508, a member whose shape is varied by temperature; 509, a gas escape port; and 510, a stopper, for an elastic body 511, that is formed of a material whose shape is varied by temperature and that can function to release a stopper at a predetermined temperature.

Figure 5A:
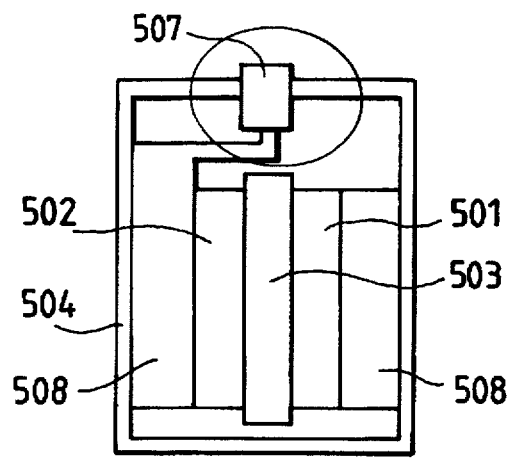
FIGS. 5A through 5D are conceptual diagrams illustrating a mechanism wherein the member whose shape is varied by temperature controls the actuation of a safety valve in consonance with the internal temperature of the battery.
Figure 5B:
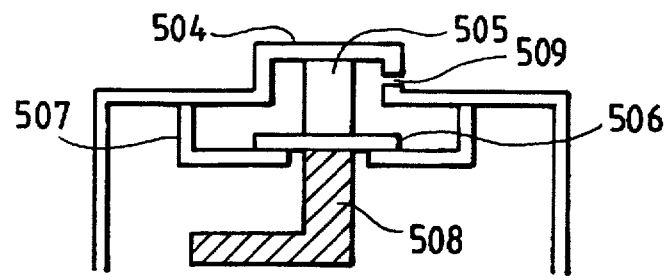
Figure 5C:
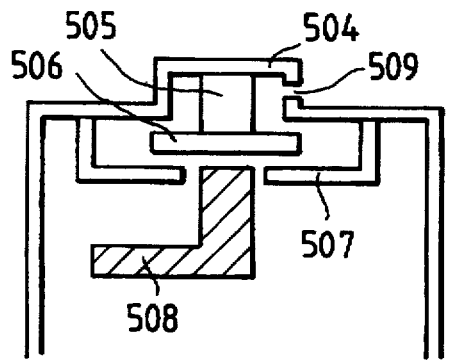
Figure 5D:
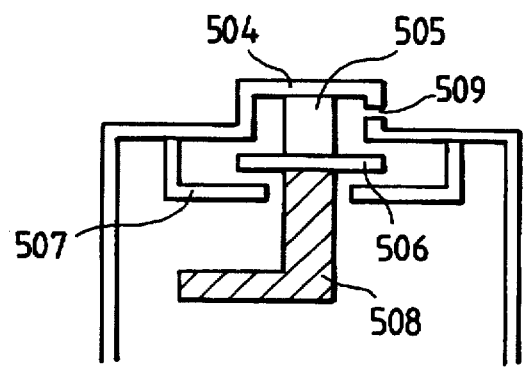

FIGS. 5B through 5D are enlarged diagrams showing the safety valve 507 in FIG. 5A. The principle of the operation of the safety valve will be explained while referring to these diagrams. In the state shown in FIG. 5B, the safety valve is closed and in the states shown in FIGS. 5C and 5D the safety valve is open. Usually (when being sealed), a conventional safety valve is closed as is shown in FIG. 5B. When the internal pressure of the battery is increased, the force exerted by the pressure becomes greater than the force with which the elastic body 505 presses against the sealing plate 506 to seal the battery. Then, as is shown in FIG. 5C, the elastic body 505 is compressed in order for a gap to be opened between the sealing plate 506 and the safety valve 507, gas escapes through the gas escape port 509, and a further increase in the internal pressure of the battery is prevented. In addition, in the present invention, the shape of the member 508 whose shape is altered by temperature is changed in shape in consonance with the temperature, as is shown in FIG. 5D, and enables the actuation of the safety valve 506 against the force with which the elastic body 505 presses against the sealing plate 506. In other words, according to the present invention, the actuation of the safety valve can be controlled in consonance not only with the internal pressure of the battery but also with the temperature in the battery, and superheating decomposition of an electrolyte solution due to an abnormal increase in the internal temperature of the battery can be prevented in advance, so that reliability is improved.

It is also possible to provide, for an identical battery, a function that controls, at a desired temperature, the actuation of a safety valve in consonance with a battery temperature by using a member whose shape is varied by temperature; and a function that again causes a change in shape outside the battery operating temperature range (higher temperature side) to release pressure, disconnects the battery input/output terminal for a positive electrode from the positive electrode in the battery, and/or the battery input/output terminal for a negative electrode from the negative electrode in the battery, and either makes it difficult for a current to flow or completely cuts off the current flow to prevent a further increase in the temperature. In this case, it is desirable that the temperature at which a function for electric disconnection is carried out be set lower than the temperature at which a function for the actuation of a safety valve is carried out. This is because when the safety valve functions, a battery that has been sealed is opened to the atmosphere, and water in the air enters the battery and adversely influence its performance. Especially with metallic lithium, etc., which easily reacts with water in the atmosphere, after water has entered the battery its performance is sometimes reduced. More specifically, it is therefore more preferable that a control procedure for an electric connection in the battery be performed before the safety valve is actuated (while the battery is still sealed), i.e., without permitting water to enter from the atmosphere, because such a function can be provided and used again that automatically returns the battery to its original, normal state when the internal temperature of the battery is reduced normally or is forcibly reduced.

It should be noted that there are two ways to use a shape-memory alloy: one is a unidirectional use that merely employs the force that is generated when the shape is recovered, and the other is a bidirectional use that repetitively employs a load that exists at the heating time and at the cooling time. In the unidirectional way, after the martensite transformation at a low temperature is performed on the alloy, it is returned to its original shape by heating. However, when it is set at a low temperature, the shape of the alloy is not the one that is obtained when the thermal hysteresis is greatly changed. Through some memory process, there is a bidirectional shape-memory alloy that memorizes the shapes at a high temperature and at a low temperature. However, because the difference between the forces at a high temperature and at a low temperature is large and the amount of displacement can not be exactly controlled, in many cases, by utilizing the characteristic of a unidirectional shape-memory alloy where it is soft at a low temperature and becomes harder at a high temperature, a bidirectional element, which is a combination of a unidirectional shape-memory alloy and a bias spring, is actually employed. The force of the spring of the shape-memory alloy is weaker than the bias spring at a low temperature and the spring is thus pressed down by the bias spring, while the force of that spring is increased at a high temperature. In order to reduce thermal hysteresis and the temperature difference during repetitive operations, and to obtain a long repeating life, an alloy is frequently used between the austenite and the rhonbohedral, which is an intermediate phase that appears between the austenite and the martensite of the Ni-Ti alloy.

At this time, a member whose shape is varied by temperature and that has a function for controlling the actuation of the safety valves may be different from the member that constitutes means for compressing the electrodes in the battery housing in a direction that is perpendicular to the faces of the electrodes.

Figure 6A:
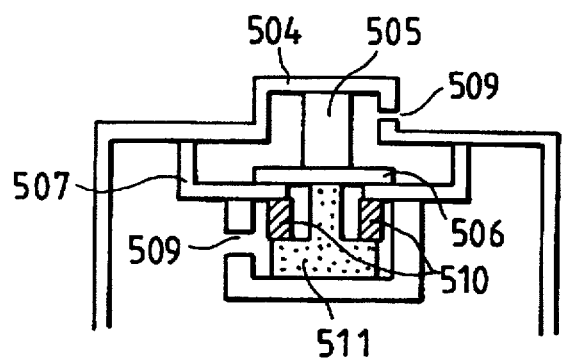
FIGS. 6A through 6C are conceptual diagrams illustrating another mechanism wherein the member whose shape is varied by temperature controls the actuation of a safety valve in consonance with the internal temperature of the battery.
Figure 6B:
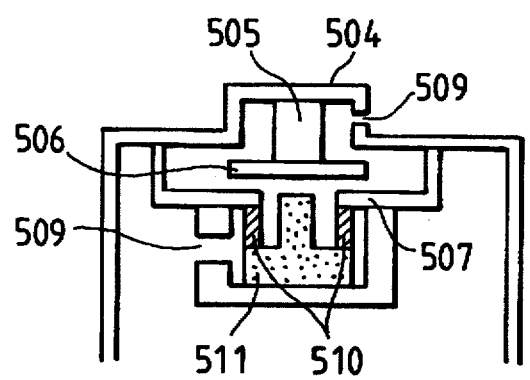
Figure 6C:
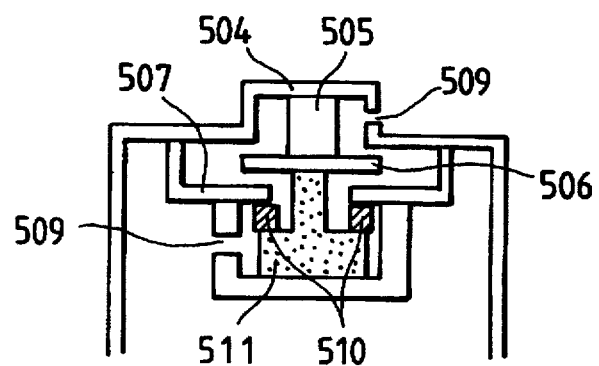

Further, according to the present invention, as is shown in FIG. 6A, the elastic body 511 that has the releasable stopper means 510 can be employed as the safety valve that is actuated in consonance with the temperature in the battery. The operational principle of such a safety valve will be explained while referring to FIGS. 6B and 6C. In FIG. 6A is shown the state where the safety valve is closed, and in FIGS. 6B and 6C are shown the states where the safety valve is open. Normally (when being sealed), the safety valve is closed, as is shown in FIG. 6A. When the internal pressure of the battery is increased, the elastic body 505 counters the force that presses against the sealing plate 506 and keeps the inside of the battery closed off from the outside. Then, as is shown in FIG. 6B, the elastic body 505 is compressed in order to open a gap between the sealing plate 506 and the safety valve 507, and gas escapes through the gas escape port 509 to the outside of the battery, so that a further increase in the internal pressure of a battery can be prevented. In addition, according to this embodiment, an elastic body 511 that has as a stopper 510 a member whose shape is varied by temperature is positioned, as is shown in FIG. 6C. When the stopper is released, the elastic force that is exerted by the elastic body 511 becomes greater than the force with which the elastic body 505 presses against the sealing plate 506, the actuation of the safety valve can be controlled as well as the safety valve can be actuated by employing the member whose shape is varied by temperatures. It should be noted that in the structure in FIG. 6C, the force that is exerted by the elastic body 511 is greater than that of the elastic body 505.

Next, a member whose shape is varied at a desired temperature, which is the feature of the present invention, will be specifically described. As a member of the present invention whose shape is altered at a desired temperature, there are a member that is formed of a shape-memory material, a member that is formed of a material that is decomposed by heating, generates gas, is expanded and does not return to its original shape, and an elastic member that has a releasable stopper. These materials will now be individually described together with the above described functions.

(Shape-memory material)

A shape-memory material whose shape is varied by temperature is a shape-memory alloy or a shape-memory resin. A shape-memory material is a material that recovers at a predetermined temperature to a shape that is memorized in advance.

(Shape-memory alloy)

A shape-memory function of a shape-memory alloy employs phase transition of a solid, and is based on thermoelastic martensite transformation. It is thought that the shape-memory function is released by the following mechanism. When an alloy in a high temperature phase (mother phase) is cooled at a temperature for transformation completion when the temperature is reduced, or is lower, the phase of the alloy is a martensite low temperature phase. Since this transformation is accompanied by shearing (elastic deformation by twinning), great elastic distortion occurs in the surroundings. In order to relax this distortion, a pair of brother phases that cancel the shearing distortion of each other appear. Thus, a macro external change is not caused. In other words, elastic deformation by twinning proceeds until the corresponding brother crystals provide the greatest distortion for a load stress.

When the deformed alloy is heated and is set to a temperature for transformation completion when the temperature is increased, or is higher, the mother phases in the same bearing as those before the deformation are generated from corresponding brother crystals in consonance with the grid relationship with the respective mother phases. In other words, even if the shape is changed by a load stress in a martensite phase, the shape of the mother phase is memorized. That is, since the shape-memory alloy memorizes the shape of the mother phase even if it is deformed at a temperature for transformation completion when the temperature is decreased, or is lower, the original shape is recovered by heating to a temperature for transformation completion when the temperature is increased.

Therefore, for the shape-memory alloy employed in this invention, its temperature for transformation completion when the temperature is increased must be lower than the melting point of a separator that is employed. For the shape-memory alloy that has a reversible change, its temperature for transformation start when the temperature is reduced must be at the lower limit (e.g., −30° C.) of the battery operating temperature range or below.

If the shape of the member is not recovered until the temperature reaches the melting point of the separator or above, the separator will be melted before the shape of the member is returned to its original shape and performs the effect, and the separator does not function at all. In other words, the transfer of the active material between the negative electrode and the positive electrode is interrupted, the internal impedance of the battery is extremely increased, and the effect of the present invention can not be fully obtained. For the reversible change of the shape of the member, once its shape is changed again within the battery operating temperature range, a permanent function is not accomplished.

An alloy whose transformation temperature is from 0° C. to 120° C. is the preferable shape-memory alloy that is employed for the present invention. When a shape-memory alloy is employed for compression means to shorten the distance between the negative electrode and the positive electrode and to reduce the impedance inside the battery, the transformation temperature is preferably from 0° C. to 80° C. When a shape-memory alloy is used for a safety mechanism to cope with an increased temperature in the battery, the transformation temperature is preferably from 80° C. to 120° C. As specific examples of a shape-memory alloy that falls in the transformation temperature range of 0° C. to 120° C, there are Ni-Ti (49 to 51 of atomic % Ni), Ni-Al (36 to 38 of atomic % Al), Cu-Al-Ni (14 to 14.5 of mass % Al, 3 to 4.5 of mass % Ni), Cu-Al-Zn (38.5 to 41.5 of mass % Zn, 2 to 3 of mass % Al), Cu-Sn (to 15 of atomic % Ni), In-Tl (18 to 23 of atomic % Tl), Fe-Cr-Ni (to 10 of mass % Cr, to 10 of mass % Ni), Fe-Mn-Si (28 to 33 of mass % Mn, 4 to 6 of mass % Si), Au-Cd (46.5 to 50 of atomic % Cd), etc. More specifically, there are, for example, Ti-Ni (atomic ratio of 1:1), Ti-Ni (atomic ratio of 49:51), Cu-Al-Ni (mass ratio of 81.7:14.1:4.2), Ti-Ni-Cu (atomic ratio of 5:4:1), Cu-Zn-Al (mass ratio of 68:27.5:4.5). The shape-memory alloy is not limited to the above described examples. The temperatures for the transformation start of the alloys when the temperature falls are 60° C. for Ti-Ni (atomic ratio of 1:1), −30° C. for Ti-Ni (atomic ratio of 49:51), 25° C. for Cu-Al-Ni (mass ratio of 81.7:14.1:4.2), 50° C. for Ti-Ni-Cu (atomic ratio of 5:4:1), and −105° C. for Cu-Zn-Al (mass ratio 68:27.5:4.5). The temperatures for the transformation completion when the temperature rises are all 100° C. or lower. Since the shapes of the alloys have been recovered at or below a temperature that is lower than the melting point (120° C. to 160° C.) of polypropylene, which is appropriate for a separator, and at which film polypropylene is shrunk by heat (about 120° C.), these alloys are preferable for the present invention.

Although there are both reversible and nonreversible shape changes for the shape-memory alloy, in a case where pressure is applied to the electrodes, which is one of the modes in the present invention, not only a shape-memory alloy of non-reversible shape recovery but also a shape-memory alloy of reversible shape recovery can be used. When the shape-memory alloy of reversible shape recovery is employed, as long as its temperature for the transformation start when the temperature falls is the battery operating temperature (−30° C. is the optimal) or lower, the shape is returned when the battery is actually operated and the shape that is obtained by applying pressure to the electrodes is maintained. This shape-memory alloy is therefore adequately usable.

The reversibility and non-reversibility of the shape change of the shape-memory alloy can be controlled by a thermal process at the time the alloy is deformed and is processed in the martensite phase. If the deformed and processed shape in the martensite phase is maintained, a non-reversible shape change is indicated. On the other hand, when the deformed and processed state is restricted by applying external force and is heated to a temperature for the transformation completion when the temperature rises, not only the shape of the mother phase but also the shape in the martensite phase can be memorized, even though only partly, and the reversible shape change is indicated.

(Shape-Memory Resin)

A shape-memory resin has a distinct property in which a formation body that has been changed into an arbitrary shape memorizes its original shape and is returned to the original shape when it is heated to a predetermined temperature or higher. Glass transition of a resin and the fusion of micro crystals are employed for a shape recovery function.

A shape-memory resin must consist of a soft polymer chain, has a net structure with cross-linking, and also a structure where molecule movements are frozen or restricted at a specific temperature that is either room temperature or higher. In a resin that has two phases, a crystal portion and a non-crystal portion, the non-crystal portion moves freely and the crystal portion acts as a bridge point in a temperature range, which indicates rubber elasticity, from the glass transition temperature Tg of the non-crystal portion to the melting point of the crystal portion. A shape-memory effect of this resin is that, when the resin is deformed and then cooled to the temperature Tg or lower, its shape is fixed by internal stress, and when it is heated, it returns to its original shape because of the internal stress.

First, the shape-memory resin is heated to a temperature that is higher than the glass transition temperature, and is compressed to obtain a formed body having a specific shape A. Then, external force is exerted on the resultant body at a high temperature to deform the body and cause it to assume an arbitrary shape. The deformed body is cooled at room temperature and its shape is fixed at shape B. Although this shape B is maintained at room temperature, once the formation body is heated to a temperature higher than the glass transition temperature, the resin is softened and is rapidly returned to the original shape B that is memorized.

Such a shape-memory resin can be easily formed (the original shape can be provided) by a common plastic formation method (extrusion, compression, injection, etc.), the changed shape can be easily fixed by heating, deformation, or cooling, and the amount of deformation can be large. A characteristic of the shape-memory resin is that the memorized shape recovery temperature is higher than normal temperature, and the deformation (natural recovery) can be ignored when it is kept under normal conditions.

As examples of the shape-memory resins, there are polyurethane, polynorbornane, trans-1,4-polyisoprene, and a styrene•butadiene block copolymer. Polyurethane is acquired by polyaddition of polyol and diisocyanate; polynorbornane is acquired by ring-opening polymerization of norbornane monomer; trans-1,4-polyisoprene is acquired by polymerization of isoprene monomer; and a styrene-butadiene copolymer is acquired by block polymerization of styrene monomer and butadiene monomer.

The shape-memory resins can be used in the same manner as the previously described shape-memory alloys.

(1) Pressure application to electrodes with an intervening separator

The function of the shape-memory member for applying pressure to the electrodes in the battery case has been described in the principle for a member whose shape is varied by temperature. An example where the shape-memory member is employed as means for compressing electrodes will be explained.

The temperature of Ti-Ni alloy (atomic ratio of 1:1) for its transformation start when the temperature falls is 60° C., which is higher than the lower limit (−30° C.) of the general-purpose battery operating temperature range. When the shape-memory alloy has change reversibility, pressure that is applied by the shape-memory alloy to the negative electrode and the positive electrode may be released by the deformation of the shape-memory alloy due to temperature. Therefore, when a battery is repeatedly used across a large temperature range, the shape-memory alloy must be non-reversible. To use this alloy, compression means need only be manufactured by employing the following procedures, for example. Ti-Ni alloy (atomic ratio of 1:1) is cooled to 52° C. or lower, which is its temperature for transformation completion when the temperature falls and causes the martensite transformation. The resultant alloy is then compressed by pressing and is then stored in a battery housing with electrodes. Later, the resultant battery is heated to 77° C. or higher, which is a temperature for transformation completion when the temperature rises, and the shape is expanded and the shape in the mother phase is recovered. In other words, the shape of the alloy is so changed that it is subjected to pressure that is built up inside the battery, and it applies a desired pressure to the electrodes. Since the change in the shape is non-reversible even if the temperature is later dropped below 77° C., the shape in which pressure is applied to the electrodes can be maintained. Thus, the compression of the electrodes from the inside of the battery case is continued, which is the object of the present invention.

As is described above, when the shape recovery function of a shape-memory alloy is employed as compression means, electrodes in a battery case need only be located at a shorter distance by an intervening separator while the shape of a shape-memory alloy plate is recovered. More specifically, the shape of an alloy, with which pressure is applied to electrodes perpendicularly to the faces of the electrodes, is memorized. Then, the alloy is compressed, for example, to easily store it in a battery housing, and is stored with the laminated electrodes. A thermal process is performed at a temperature (temperature for transformation completion when the temperature rises), or higher, at which the alloy will recover and resumes a memorized shape and which is lower than the melting point of the separator, so that the alloy recovers and resumes the shape that is memorized in advance.

According to the present invention, a member that constitutes the compression means for compressing electrodes with an intervening separator can also be used as a battery housing. A battery housing is produced by using, for example, Ti-Ni alloy (atomic ratio of 49:51), and is cooled by using liquid nitrogen at −30° C. or lower, which is a temperature for transformation completion when the temperature falls. The battery housing is spread open by external force and before the temperature rises to room temperature, electrodes are quickly inserted therein. Then, the shape of the battery housing is recovered, i.e., the battery housing is narrowed, so that pressure is applied to the electrodes.

To obtain the effect of the present invention, if pressure may be locally applied to the electrodes when the member of the compression means recovers to its memorized shape, it is effective for a rigid member, such as a stainless steel plate or a titanium plate, to be located at least between the above member and the laminated electrodes to uniformize pressure. The performance of a battery can be prevented from being deteriorated due to the local shape change.

(2) Electric connection and disconnection between battery input/output terminals and battery internal electrodes An explanation has been given, by referring to FIGS. 2A through 2C, FIGS. 3A through 3C and FIGS. 4A through 4C, for the operational principle of a function of a shape-memory member that performs electric connection and disconnection between a battery input/output terminal for a positive electrode and the positive electrode in a battery, and/or between a battery input/output terminal for a negative electrode and the negative electrode in the battery. More specifically, when the shape-memory member is employed as means for electrically connecting the battery input/output terminal for a positive electrode to the positive electrode in the battery, and/or for electrically connecting the battery input/output terminal for a negative electrode to the negative electrode in the battery, the shape-memory member need only to be provided as a member shown in FIGS. 2A through 2C whose shape is varied by temperature. That is, in the same manner as in the case where the shape-memory member is employed as means for compressing the electrodes, the shape-memory member need only memorize the shape with which pressure is applied, so that the battery input/output terminal for a positive electrode can be electrically connected to the positive electrode in the battery and the battery input/output terminal for a negative electrode can be electrically connected to the negative electrode in the battery. In the structure shown in FIGS. 2A through 2C, the electric connection and disconnection is possible, and at the same time the distance between the electrodes can be changed with the intervening separator. In addition, the electrode lead tab 207 can also be used as a pressure uniformizing member.

Further, in a case where the shape-memory alloy is employed to electrically connect the battery input/output terminal for a positive electrode to the positive electrode in the battery, and/or the battery input/output terminal for a negative electrode to the negative electrode, a bidirectional shape-memory alloy can be employed. This shape-memory alloy is so set that it releases pressure, which is applied at contact areas for the battery input/output terminals and the electrodes or the electrode lead tab, at a temperature that is less than the melting point of the separator (e.g., 120° C. when the separator of polyethylene is employed) and that performs electric disconnection between the battery input/output terminal for a positive electrode and the positive electrode in the battery, and/or between the battery input/output terminal for a negative electrode and the negative electrode in the battery. Before the safety valve is actuated by increasing the temperature in the battery due to overcharging and by decomposing an electrolyte solution, such a bidirectional shape-memory alloy can disconnect the battery input/output terminals from the positive electrode and from the negative electrode (break the current flow path).

The shape-memory alloy has electronic conductivity. When a battery housing serves as one of the input/output terminals to electrically connect its internal housing to the electrodes in the battery case without using a tab, the structure becomes simple and the shape-memory alloy is very appropriate for improving productivity. Therefore, as is shown in FIGS. 3A through 3C, by using the member that compresses the electrodes, the battery input/output terminal for a positive electrode is brought into contact with the positive electrode in the battery, and/or the battery input/output terminal for a negative electrode is brought into contact with the negative electrode to provide an electrical connection.

To obtain electric continuity (a continuous electric connection) by means of pressurized contact, to reduce contact resistance, it is more preferable that a coating of a soft conductor, such as gold, silver, indium, tin or solder, be applied to portions where the battery input/output terminals, the shape-memory alloy that constitutes compression means, and a collector of the negative and positive electrodes come into contact.

(3) Control of actuation of safety valve

The operational principle for a function where the shape-memory member controls the actuation of the safety valve in consonance with a temperature in the battery is the same as the principle for the member shown in FIGS. 5A through 5D and FIGS. 6A through 6C whose shape is varied by temperature. That is, when the shape-memory member is used as means for controlling the actuation of the safety valve in consonance with the temperature in the battery, the shape-memory member need only be provided as a member that is shown in FIGS. 5A through 5D whose shape is varied by temperature. In other words, as in the case where the shape-memory member is used as electrode compression means, the shape-memory member need only memorize in advance the shape in which the actuation of the safety valve is controlled in consonance with the temperature in the battery. However, some means is necessary so that the safety valve is not actuated at the same temperature as that at which the shape is changed to compress the electrodes in the battery (more specifically, perpendicular to the faces of the electrodes in FIGS. 1A and 1B), but is actuated at a higher temperature (e.g., 120° C.). For example, a member that is different from the shape-memory member for compression means and that recovers its shape at a higher temperature is used as means for controlling the actuation of the safety valve. The bidirectional shape change need only be memorized by the portion that controls the actuation of the safety valve. That is, since the shape-memory member is used as a member for controlling the actuation of the safety valve, it is possible to provide a highly reliable battery that can actuate the safety valve in consonance not only with the internal pressure of the battery but also with the temperature in the battery.

(4) Facilitation of after-use recycling

In the present invention, when as a material for compression member, an alloy, such as Ti-Ni (atomic ratio 49:51) is employed that has a temperature for a transformation start when the temperature falls that is equal to or below the lower limit of the battery operating temperature (e.g., −30° C.), and when its shape change is reversible, it is effective not only when pressure is applied to the electrodes but also when the used battery is collected and the electrodes are removed from the battery case as previously described.

The shape in which the electrodes and the separator are easily removed, for example, the shrunken shape, is memorized to the reversible shape-memory alloy on the lower temperature side. To disassemble the battery, it is cooled to a temperature for a transformation start when the temperature falls, or lower, but preferably, to a temperature for transformation completion when the temperature falls, or lower. Then, the shape of the compression means is shrunk and the electrodes can be easily removed.

(Non-reversible volume expansion material)

A material whose volume is expanded non-reversibly at a predetermined temperature can be used as a member whose shape is changed at a desired temperature and which is used as the compression means of the present invention. As one example there is a material that generates a gas and is expanded when heated, and does not return to its original shape.

Further, a member, employed for the present invention, that generates a gas and expands and then maintains that expanded shape, regardless of the temperature, must generate gas at a temperature below the melting point of the separator. If it does not generate gas until the temperature reaches the melting point of the separator or above, the separator is melted and does not function as a separator before the effect of the present invention is acquired. In other words, the active material is prevented from being transferred between the negative electrode and the positive electrode, the internal impedance of the battery is extremely increased, and the effect of the present invention is not satisfactory.

In the present invention, as a member that generates gas and expands by heating at a temperature that is lower than the melting point of the separator and is not returned to its original shape, there is a member wherein a material that generates gas at a predetermined temperature below the melting point of the separator is dispersed as a foaming material in a resin. Or, a material that generates gas at a predetermined temperature below the melting point of the separator is sealed in a material that is shaped like a balloon as the volume of gas, etc., is increased.

The examples for a material employed for the present invention that generates gas by heating are: inorganic foaming material, such as ammonium hydrogencarbonate, ammonium carbonate, sodium hydrogencarbonate, ammonium nitrite and sodium borohydride, azobisisobutyronitrile, 5-morpholinyl-1,2,3,4-chiatriazole; and various hydrogen-storing alloys, such as La and a La alloy. It is preferable that the temperature at which gas is generated by heating the material be 115° C. or lower. This temperature is below the melting point of polyolefin, such as polypropylene or polyethylene, that is generally employed for a separator in a lithium secondary battery. The resin examples that disperse as foaming agents a material that is heated and generates gas are polyolefin that does not react with an electrolyte solution, fluorocarbon polymers, silicone resin, urethane that is highly cross-linked, and an epoxy resin. It is preferable that gold powder having high heat conduction be added to increase the heat conductivity. Thus, gas is more easily generated. As expansion/compression materials that seal in a gas generating material and that expand like a balloon, various rubbers or superplastic metals, such as titanium-aluminum alloy, can be employed.

Of course, the separator of the present invention is not limited to polypropylene or polyethylene. A material that generates gas and expands at a temperature lower than the melting point of an employed separator need only be properly selected.

(1) Pressure application to electrodes with an intervening separator

The function in which a member that generates gas, etc., by heating, is expanded and is not returned to its original shape applies pressure to the electrodes in the battery is the same as the operational principle of the member whose shape is varied by temperature. That is, a material that generates gas by heating, is expanded and is not returned to its original shape need simply be positioned as is the member whose shape is varied by temperature in FIGS. 1A and 1B. Some means are required at the following points.

The material that is decomposed by heating, generates gas, is expanded and is not returned to its original shape is inserted into a battery housing the electrodes. Then, through a heating process, the member generates gas at a temperature lower than the melting point of the separator and is expanded, and pressure can thus be applied to the electrodes. Since gas, such as carbon dioxide and water, is generated, it is preferable that, to manufacture a tightly sealed battery, tight sealing be conducted after the decomposition by heating and the gas generation. Or, it is preferable that a gas escape valve be provided that it is reset after the gas escapes. It is more desirable that an electrolyte solution be injected after the compression means is expanded and pressurizes the electrodes.

When lithium is contained in the negative electrode active material, and when water is generated during the gas generation of the member that is decomposed by heating and generates gas, it is preferable that an electrolyte solution be injected into a cell after the gas is generated, for example, after a thermal process is performed under reduced pressure and a dehydration process is thoroughly performed, because an adverse effect due to water can be eliminated.

It is more preferable for a partition wall, such as a porous ceramic, through which gas generated-at the heating process can be transmitted to be provided, in order to attain the target pressure by preventing the member that is expanded during the heating process from escaping into a vacant space in the battery.

(2) Electric connection between battery input/output terminals and internal battery electrodes As in the case where the shape-memory member is employed, in the case where the member that generates gas and expands by heating and does not return to its original shape is employed, electric continuity is possible between the battery input/output terminal for a positive electrode and the positive electrode of the battery, and/or between the battery input/output terminal for a negative electrode and the negative electrode of the battery.

That is, when the aforementioned shape-memory member is replaced by the material shown in FIGS. 2A through 2C and FIGS. 4A through 4C that generates gas by heating, is expanded and is not returned to its original shape, satisfactory pressure application and contact is provided by generating gas by heating and expanding its volume, and the battery input/output terminal for a positive electrode can be electrically connected to the positive electrode and/or the battery input/output terminal for a negative electrode can be electrically connected to the negative electrode in the battery.

(3) Control of actuation of safety valve

The principle for the above described member whose shape is varied by temperature can also be applied when a member that is expanded due to the generation of gas, etc., by heating and is not returned to its original shape is employed as a member for controlling the actuation of the safety valve in consonance with the temperature in a battery. That is, when the member that is expanded by gas generation by heating and is not returned to its original shape is employed as means for controlling the actuation of the safety valve in consonance with the temperature of the battery, that member need only be positioned as is the member 508 shown in FIGS. 5A through 5D whose shape is varied by temperature. In other words, that member need only be positioned in the same manner as in the case where the shape-memory member is used as means for controlling the actuation of the safety valve. At this time, however, some means is required to actuate the safety valve, not at the same temperature as for the shape change for compression of the electrodes in the battery (more specifically, perpendicular to the faces of the electrodes in FIGS. 1A and 1B), but at a higher temperature (e.g., 120° C.). For example, as means for controlling the actuation of the safety valve, such a material is employed that generates gas at a different, higher temperature than that of the material which is expanded due to gas generation by heating and is not returned to its original shape.

That is, since such a member is employed that is expanded due to the generation of gas, etc., by heating and is not returned to its original shape, it is possible to provide a more reliable battery wherein a safety valve can be actuated in consonance not only with the internal pressure of the battery but also with the internal temperature of the battery.

(Elastic body that has a stopper function for restricting its elastic force)

The compression means of the present invention can be constituted by, for example, a stopper that is formed of a material whose shape is varied by temperature and an elastic body.

The elastic body can be, for example, a common coil spring that is made of metal, such as stainless steel wire, piano wire, spring steel products and ceramics material, such as silicon nitride, a leaf spring, or another well known elastic body. Preferably, the material of the elastic body does not react with battery components, especially, an electrolyte solution. When a material will react with an electrolyte solution, it is coated with a resin (fluorocarbon polymers, etc.) that is not affected by an electrolytic solution to provide for that material the withstandability property relative to the electrolyte solution.

A material that can release the stopper function at a predetermined temperature, i.e., that can release the elastic force of the elastic body, is employed as a material for a stopper. Organic polymer material that includes shape-memory polymer that is melted and deformed, metal with a low melting point, or a shape-memory alloy are example materials. When the shape-memory member is used as a stopper, the shape is recovered by heating and a shape by which the stopper function is released need only be memorized. In other words, it is only required that before its shape is recovered, the shape-memory member function as a stopper for releasing the elastic force of the elastic body. After its shape has been recovered, the member loses the function.

The function of the elastic body that has a stopper means that can be released at a predetermined temperature will now be described.

(1) Pressure application to electrodes

An explanation will be given for an example where an elastic body that includes releasable stopper means is employed and the stopper is released at a predetermined temperature to apply pressure to the electrodes.

Figure 7A:
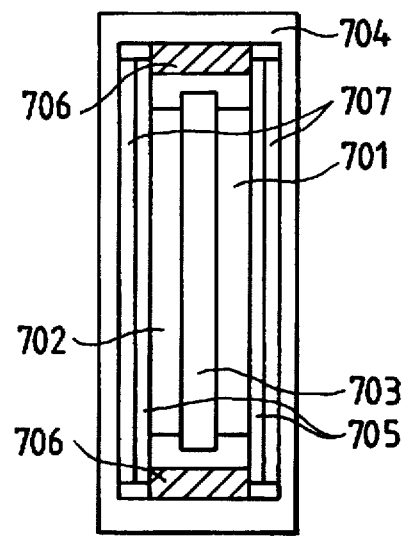
FIGS. 7A and 7B are conceptual diagrams illustrating a compression mechanism for an elastic body that has releasable stopper means.
Figure 7B:
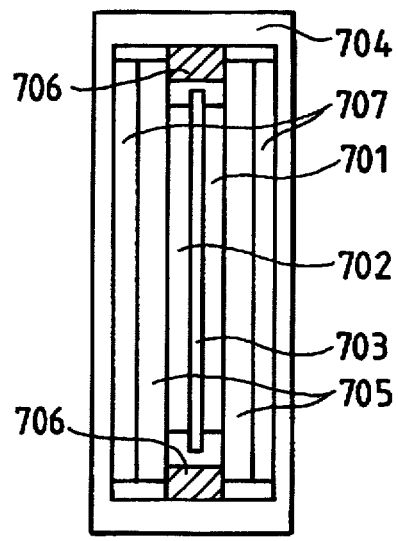

FIGS. 7A and 7B are schematic cross sectional views of a battery for explaining a mechanism for compressing electrodes in a battery housing when controllable (releasable) stopper means and an elastic body 705 are employed for applying compression to a positive electrode 702 and a negative electrode 701. Reference number 701 denotes a negative electrode; 702, a positive electrode; 703, a separator; and 704, a battery case. The elastic body 705 applies pressure between the positive electrode 702 and the negative electrode 701, and a stopper 706 is formed of a member whose shape is varied by temperature. The elastic body 705 and the stopper 706 constitute the compression means of the present invention. An insulator 707 is employed to ensure electric separation from the battery housing 704, etc..

In FIG. 7A, a schematic cross sectional view of a battery before pressure from the elastic body is released by the stopper, the electrodes are inserted into the battery housing 704 with the elastic body (compression means) 705 that has the elasticity releasable stopper means 706, while the negative electrode 701 and the positive electrode 702 are located opposite each other with the separator in between. In FIG. 7B, a schematic cross sectional view of a battery after the pressure from the elastic body has been released by the stopper, while the electrodes and the compression means are inserted into the battery case, the resultant structure is passed through at a temperature where the shape of the stopper 706 is changed. When the shape of the stopper 706 is thereby changed and the pressure from the elastic body 705 is released, the electrodes (the positive and the negative electrodes 702 and 701) are pressurized by the elastic body 705, and the distance between of the electrodes is reduced.

When the shape-memory member is used as the stopper 706, only the same material and the same manufacturing method need be employed as when the shape-memory member is used as compression means.

If pressure is applied locally to the electrodes when the stopper is released after the electrodes have been stored, a rigid member, such as a stainless steel plate or a titanium plate, need only be located at least between the elastic body 705 and the laminated electrodes to uniformize pressure.

(2) Electric connection and disconnection of battery input/output terminals and battery internal electrodes The principle for the aforementioned member whose shape is varied by temperature can be applied to the operational principle for a function where the elastic body 705 and the stopper means 706 that can release the elastic force of the elastic body 705 perform electric connection and disconnection between the battery input/output terminal for a positive electrode and the positive electrode 702 in the battery, and/or the battery input/output terminal for a negative electrode and the negative electrode 701 in the battery. More specifically, when the stopper means 706, which can release the elastic force of the elastic body 705, and the elastic body 705 are employed as means for electrically connecting the battery positive-side input/output terminal to the positive electrode 702 and for electrically connecting the battery negative-side input/output terminal to the negative terminal 701, the elastic body 705 that has the releasable stopper means 706 need only be located as is the member 205 shown in FIGS. 2A through 2C whose shape is varied by temperature. That is, in the same manner as when the elastic body that has the releasable stopper means is used as means for compressing electrodes, the shape of the elastic body is changed into such a shape that, when the stopper is released, the battery input/output terminal for a positive electrode can be electrically connected to the positive electrode in the battery, and/or the battery input/output terminal for a negative electrode can be electrically connected to the negative electrode.

As a stopper of an elastic body that has a releasable stopper means to electrically connect the battery positive-side input/output terminal to the positive electrode, and/or to electrically connect the battery negative side input/output terminal to the negative electrode, a bidirectional shape-memory alloy can be employed. This alloy is so set that pressure applied to a contact area of the battery input/output terminals and internal electrodes of the battery, or the electrode lead tab is released at a temperature less than the melting point of the separator (e.g., 120° C. when the separator is polypropylene) and the battery input/output terminal for a positive electrode is disconnected from the positive electrode, and/or the battery input/output terminal for a negative electrode is disconnected from the negative electrode. With the employment of the bidirectional shape-memory alloy, the electric connection between the battery positive-side input/output terminal and the positive terminal of the battery, and/or between the battery negative-side input/output terminal and the negative terminal of the battery can be cut off in consonance with the temperature. Further, before the safety valve is actuated, the electric disconnection can be performed (a conductive path is interrupted). Therefore, a more reliable secondary battery can be provided.

(3) Controlling actuation of safety valve

The aforementioned principle for the member whose shape is varied by temperature can also be applied to an operational principle for a function where an elastic body, which has stopper means that can release the elastic force of the elastic body, controls the actuation of the safety valve in consonance with the temperature in the battery. That is, when the elastic body that has the releasable stopper means is employed as means for controlling the actuation of the safety valve in consonance with the temperature in the battery, the shape-memory member is replaced by that elastic body, which is then located as is shown in FIG. 5A. At this time, however, some means is required to release the stopper and to actuate the safety valve, not at the same temperature as for the shape change for compression of the electrodes in the battery (more specifically, perpendicular to the faces of the electrodes in FIGS. 1A and 1B), but at a higher temperature (e.g., 120° C.). For example, as means for controlling the actuation of the safety valve a stopper is used that is released at a higher temperature than the temperature at which the stopper is released that is used for means for compressing the electrodes perpendicular to the faces of the electrodes.

That is, since an elastic member that has stopper means that can release the elastic force of the elastic member is used to control the actuation of the safety valve, it is possible to provide a more reliable battery wherein a safety valve can be actuated in consonance not only with the internal pressure of the battery but also with the internal temperature of the battery.

(4) Facilitation of after-use recycling

In the present invention, for the facilitation of the disassembly of a battery, the function of a shape-memory alloy is used to release the pressure applied to the positive and the negative electrodes. For example, a bidirectional element that has a temperature (e.g., −30° C.) lower than the battery operating temperature, and the combination of a unidirectional shape-memory alloy Ti-Ni (atomic ratio 49:51) and a bias spring can function to release the pressure on the electrodes. Thus, the positive electrode, the negative electrode, and the separator, all of which are battery members, can be easily removed from the battery housing, and the collection and recycling of the source is facilitated.

The shape in which the electrodes can be easily removed, for example, the shape in which pressure on the electrodes is released by expansion, is memorized by the reversible shape-memory alloy on the lower temperature side. To disassemble the battery, it is cooled to a temperature for a transformation start when the temperature falls, or lower, preferably, to a temperature for transformation completion when the temperature falls, or lower. Then, the shape of the stopper that controls the elastic force of the elastic body is expanded and the pressure to the electrodes is released, so that the electrodes can be easily removed.

(Location of electrode compression means)

Figure 8A:
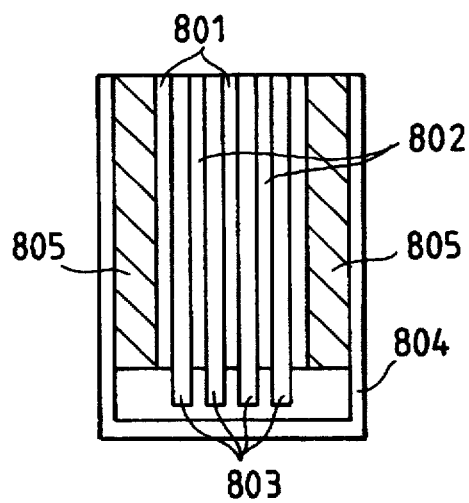
FIGS. 8A through 8D are conceptual diagrams illustrating an example arrangement of compression means that is constituted by a member whose shape is varied by temperature.
Figure 8B:
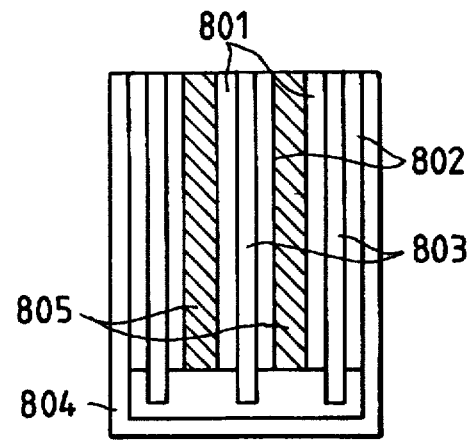
Figure 8C:
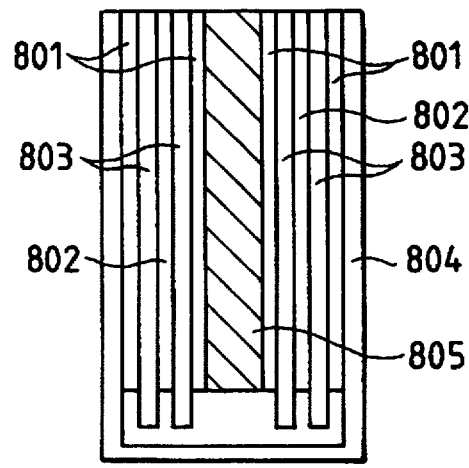
Figure 8D:
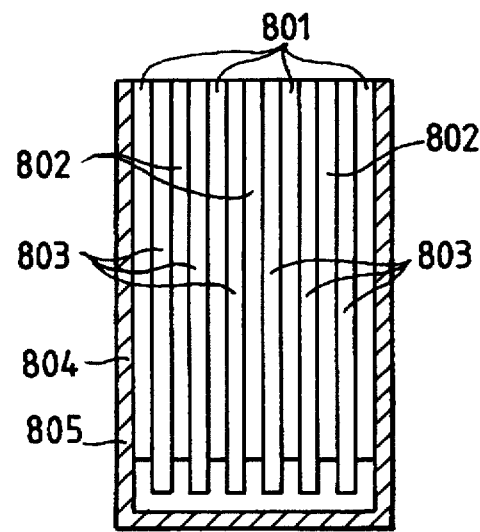

The location of the electrode compression means will now be explained while referring to FIGS. 8A through 8D. FIGS. 8A through 8D are schematic cross sectional views of a battery for indicating the location of electrode compression means for which a member whose shape is varied by temperature is employed. In FIGS. 8A through 8D, reference number 801 denotes a negative electrode; 802, a positive electrode; 803, a separator; 804, a battery housing; and 805, a member that constitutes the compression means. The compression means of the present invention may be located between the outermost electrodes and the internal wall of the battery housing 804, as is shown in FIG. 8A, between the electrodes, as is shown in FIG. 8B, or in the center of the battery housing, as is shown in FIG. 8C, or the battery case itself may serve as compression means, as is shown in FIG. 8D.

In short, the compression means should be located at a position where it can compress the electrodes perpendicular to the faces of the electrodes as the shape is changed by temperature. That is, the compression means may be provided between the battery case and the electrode, the electrodes may be located between the compression means and the internal wall of the battery housing, or the battery housing itself may also serve as the compression means.

To acquire the effects of the present invention, it is effective from the view of the increase of applied pressure that the above described member be located at not a single position but at a plurality of positions, for example, between the battery case and the outermost surface of each laminated electrode.

Since the above member is used as a member that constitutes the compression means of a lithium battery, a complete dehydration process is required. Usually, the dehydration process is carried out by preforming a thermal process under a lower pressure. If the memorized shape (before the compression means is stored or inserted in the battery housing) is changed at this time, the effects of the present invention can not be acquired. It is therefore desirable in this present invention that the dehydration process be performed before the member whose shape is varied by temperature begins changing shape.

(Compression equalization means)

The present invention employs compression uniformizing means in addition to compression means that is intended to further uniformize pressure that is applied by the compression means.

In other words, another feature of the present invention is that it has compression uniformizing means that uniformize pressure that is exerted by the compression means. By uniformizing the pressure applied to the electrodes, the dendrite growth of lithium is seldom caused. Even if the surfaces of the electrodes are rough, pressure can be uniformly applied to the electrodes by the compression means and the size of the battery can be easily increased.

The compression uniformizing means used in the present invention will be specifically explained. A member that shows its flowability at a temperature lower than the melting point of the separator and that does not react with the electrolyte or the electrolyte solution, or is processed that it does not react with it is appropriate as a member for the compression uniformizing means of the present invention.

According to the present invention, the compression uniformizing means is made of a member that shows its flowability at a temperature lower than the melting point of the separator and that does not react with the electrolyte or the electrolyte solution, or is so processed that is does not react with it. Since such a compression uniformizing means is located with the compression means, a sufficient pressure can be exerted for the lamination of the positive and the negative electrodes with the intervening separators. The reason will be described while referring to FIGS. 9A and 9B.

Figure 9A:
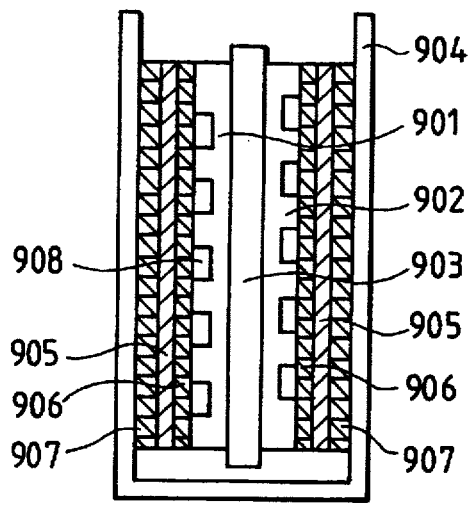
FIGS. 9A and 9B are conceptual diagrams for explaining compression uniformizing means.
Figure 9B:
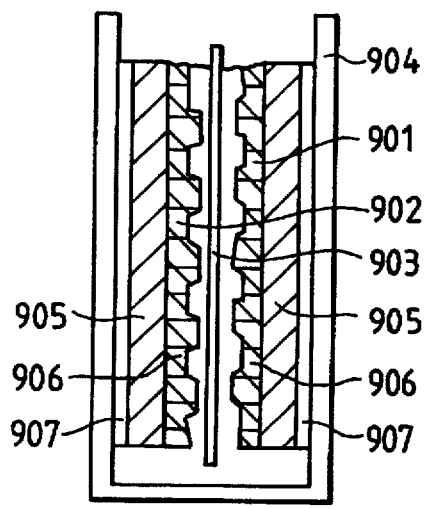

FIGS. 9A and 9B are schematic cross sectional views of a battery for explaining the mechanism of the compression uniformizing means of the present invention. Reference number 901 denotes a negative electrode; 902, a positive electrode; 903, a separator; 904, a battery housing; 905, compression means; 906, compression uniformizing means; 907, an insulator; and 908, raised and recessed portions on the surfaces of the electrodes.

FIG. 9A is a schematic cross sectional view of a battery before pressure is uniformly applied. While the negative electrode 901 and the positive electrode 902 face each other with the separator 903 in between, the electrodes are inserted into the battery housing 904 with the compression means 905 and the compression uniformizing means 906. FIG. 9B is a schematic cross sectional view of a battery when the pressure is uniformly applied to the electrodes (positive and negative electrodes). A material for the compression uniformizing means 906 is fluidized and evens the raised and recessed portions of the electrodes. The structure is heated to a temperature (at which the shape of the member for the compression means is changed) that is equal to or higher that at which the pressure is applied, and the pressure uniformizing is accomplished. In other words, the pressure applied state is uniform regardless of the uneven surfaces of the electrodes.

For the above reason, the pressure that is applied perpendicular to the faces of the electrodes (both positive and negative electrodes) can be uniformized. Further, according to the present invention, the compression uniformizing function can be added to the compression means. In such an example compression means, a resin that contains a foaming agent is employed.

The compression uniformizing means can function also for the charging and discharging of a battery when the material of the means is selected properly. More specifically, when pressure is not sufficiently applied to the negative electrode and the positive electrode, both of which are opposite each other with the separator intervening, but is applied to the local portion, the impedance of the local portion is reduced. Thus, when the battery is charged and discharged, sometimes a current flows first to that portion, and thus the temperature at that portion becomes higher than that at the other portions. Then, a member, at the portion where the temperature is increased, that shows flowability at a temperature lower than the melting point has reached its softening point. That member is then fluidized and flows on the opposite face in a direction in which pressure escapes.

Since all the members are not fluidized, the members located between the outermost electrodes and the battery housing have not been fluidized. Further, as the fluidized member avoids a little pressure, the strength of the electric field is reduced and a current density is lowered, so that the temperature rise is suppressed and flowability is stopped. By repeating the above processes, the pressure applied to the electrodes becomes constant. Uniformized compression when a battery is used can be realized between the negative electrode and the positive electrode that are laminated with the separator, and as a result, the service life of a battery is extended. When there is no portion where a current flows on priority, the compression uniformizing means is not fluidized during the charging and discharging of the battery. Since the member for that compression uniformizing means does not react or is so processed that it does not react with an electrolyte solution, the charging and discharging characteristic of a secondary battery is not adversely affected.

Appropriate material that forms the compression uniformizing means is polyethylene polymer or micromolecule wax, etc., that shows its flowability at a temperature that is the melting point of the separator or below, e.g., 100° C. or below. Since the polymer generally has excellent resistance to an organic solvent, it is very stable relative to the electrolyte solution employed in the lithium secondary battery, etc., and is fluidized in the battery operating temperature range.

When polystylene, poly(vinyl chloride), etc., that is fluidized approximately at 85° C. is employed as a member that is fluidized at a temperature that is less than the melting point of the separator of the present invention, an insoluble process relative to an electrolyte solution must be performed on this material because this material is directly dissolved in an electrolyte solution as it is used. There are anti-soluble treatments that are provided by lamination of a material that is stable in an electrolyte solution, or by performing a cross-linking process.

A member that constitutes the compression uniformizing means must be fluidized at a temperature below the melting point of the separator. If the compression uniformizing means is not fluidized until the temperature reaches the melting point of the separator or higher, the separator is melted first before the member begins to fluidize and applies uniform pressure to the laminated negative and positive electrodes with the intervening separator. The transfer of the active material between the negative electrode and the positive electrode is interrupted, the internal impedance of the battery is extremely increased, and as a result, the effect of the present invention can not be acquired.

It is preferable that the member that constitutes the compression uniformizing means be located between the compression means and the electrodes. For example, with a desired thickness obtained by press adhesion or coating, the member can be located at the face of the outermost electrode that is opposite to the compression means, or at the face of the compression means that is opposite the electrodes.

Conventional coating methods, such as blade coating, bar coating, roll coating, or dip coating, can be employed. When the bar coating method is employed to cover the member and locate it, a paste is made by using a solvent such as xylene, and a member that is fluidized at a temperature below the melting point of the separator is covered with that paste to a desired thickness. Then, the drying and heating process is performed on that member.

In addition, at the outermost portion of the laminated positive and negative electrodes with the intervening separator, a member that is fluidized at a temperature below the melting point of the separator may be located before the electrodes are laminated or before the electrodes are manufactured.

The other members that are employed for the lithium secondary battery of the present invention will now be described.

Negative electrode material 101

The negative electrode of the present invention can be lithium metal, lithium alloy, graphite, or various types of carbon materials. A lithium alloy example is an alloy of lithium and aluminum, magnesium, potassium, sodium, calcium, zinc, or lead.

Separator 103

The separator of the present invention requires a function for preventing a short-circuit between the negative electrode and the positive electrode. When an electrolyte solution is employed, a function for holding that solution is also needed. It is necessary for the separator to have small pores through which ions (lithium ions) that affect battery reactions can be transferred, and to be insoluble and stable relative to an electrolyte solution. Thus, non-woven fabric of glass, polypropylene, polyethylene or fluorocarbon polymers, or a material having a micropore structure may be employed.

In addition, metal oxide film that has micropores or resin film obtained by compounding metal oxide are proper.

Positive electrode material 102

The positive electrode of the present invention is formed on a collector by mixing a positive electrode active material, conducting auxiliary agent, and a binding agent (binder), and adding a solvent if necessary. Appropriate positive electrode active material is a layered material wherein a lithium is intercalated: a metal oxide, such as nickel oxide, cobalt oxide, iron oxide, titanium oxide, vanadium oxide, molybdenum oxide, chromium oxide, and tungsten oxide; a metal sulfide, such as molybdenum sulfide, iron sulfide, or and titanium sulfide; a hydroxide, such as iron oxyhydroxide; or a conductive polymer, such as polyacetylene, polyolefin, polypyrrole, and polyaniline.

When the conductivity of the positive electrode active material is insufficient, an auxiliary conducting material is added as needed to improve the electronic conductivity of the positive electrode and to improve the collection power of the positive electrode. An appropriate material is carbon powder, such as acetylene black, ketjen black, or graphite; or a metal powder, such as nickel, titanium, copper, and stainless steel. It is preferable that the ratio of mixture to the active material be 1:1 or lower to prevent the reduction of the positive electrode energy density and to ensure adequate electronic conductivity in the positive electrode.

The addition of a powder, as the conducting auxiliary material, that has electronic conductivity has been described as an example. When a small amount of a conducting auxiliary agent in a needle shape, of fabric, or in a flake shape is further added, the member is more effective for increasing the strength of the electrodes and for increasing electric collection power.

The binder agent is properly used to bind the active materials when compression is insufficient for the formation of the positive electrode active material, and to prevent the active material from falling from the collector due to the occurrence of cracks during the charging/discharging cycle. The binder is, for example, fluorocarbon polymers, polyethylene, polypropylene, silicon resin, or ethylene-butadiene-polymer, all of which are stable relative to an electrolyte solution.

Electrolytic solution

An electrolyte is used as it is. Or, an electrolyte solution or one that is fixed by adding a gel agent such as polymer to an electrolyte solution is used. Usually, an electrolyte solution where an electrolyte is dissolved in a solvent is retained in the separator.

As an electrolyte, a salt that consists of lithium ions or Lewis acid-base ions ($BF_4^-$, $PF_6^-$, $AsF_6^-$, $ClO_4^-$, $CF_3SO_3^-$, $B(CH_6H_5)_4^-$) or a mixture of them may be used. Aside from the above materials, a salt that consists of positive ions, such as sodium ions, potassium ions, and tetraalkylanmonium ions; or Lewis acid-ions can be used. It is desirable that a complete dehydration process and a deoxygenation process, such as heating and drying under reduced pressure, be performed on the above salts before they are used.

As an appropriate solvent for an electrolyte, acetonitrile, benzonitrile, propylenecarbonate, ethylenecarbonate, dimethylcarbonate, diethylcarbonate, dimethylformamide, tetrahydrofuran, nitrobenzene, dichloroethane, diethoxyethane, chlorobenzene, γ-butyl lactone, dioxsolan, sulforan, nitromethane, demethylsulfide, dimethoxyethane, methylformate, 3-methyl-2-oxazolizine, 2-methyltetrahydrofuran, 3-propylsydnone, sulfur dioxide, phosphoryl chloride, thionyl chloride, or sulfuryl chloride, or a liquid mixture of these may be used.

It is preferable that, before use, a dehydration process be performed on the solvent using active alumina, molecular sieve, phosphorus pentoxide, or calcium chloride, or an inactive gas, distillation, elimination of impurities, and dehydration process be performed on some solvents with coexisting alkaline metal.

To prevent leakage of the electrolyte solution, it is desirable that the solution be gelled. The preferable gelling agent is a polymer that absorbs the solvent of the electrolyte solution and expands. For such a polymer, polyethyleneoxide, poly(vinyl alcohol), or polyacrylamide can be employed.

An electrolyte or an electrolyte solution having a higher conductivity is better. Preferably, its conductivity should be at least $1 \times 10^{-3}$ S/cm at room temperature (25° C.), and more preferably, $5 \times 10^{-3}$ S/cm.

Collector

A collector for the negative electrode and for the positive electrode must be a material that has electronic conductivity. Carbon, stainless steel, titanium, nickel, copper aluminum, platinum, or gold can be used.

Battery case 104

When the external housing, which is a battery case, serves also as an output terminal, a metal such as stainless steel can be used. In other cases, a plastic resin material can be used that does not react with the components inside the battery case, especially, the electrolyte solution.

Method for manufacturing a secondary battery

In the method for manufacturing a secondary battery of the present invention, in a dehumidified atmosphere, at least one negative electrode, one positive electrode, one separator, and one member whose shape is changed by temperature are inserted in a battery housing, and a process is performed whereby the resultant structure is at least passed through at a temperature that is different from that during the insertion (e.g., a temperature at which the shape of the member is changed) and that is lower than the melting point of the separator. Secondary batteries that have great charging/discharging power can be easily and consistently manufactured.

The manufacturing method of the present invention is characterized by the inclusion of a step of performing a compression function by passing the structure through a predetermined temperature, and a step of accomplishing the compression uniformizing function.

When a temperature at which the compression means functions is lower than room temperature, dew formation occurs, which results in a reduction in the performance of a lithium battery. To prevent the dew formation, the assembly of a battery must be performed in the dehumidified atmosphere until the sealing step is completed.

The preferred lithium battery of the present invention is assembled by the following method. The assembly is performed in an atmosphere where lithium, the active material, does not react with water, e.g., in dry air from which water has been completely removed, or in an inactive gas. A negative electrode and a positive electrode, each of which has an electrode lead tab that is made in advance, are laminated with a separator. The electrodes and a member whose shape is varied by temperature are inserted into a battery case as force is applied externally. A thermal process is performed to change the shape of the member, and an electrolyte solution is injected. Following this, a cap is attached to the resultant structure, which is then tightly sealed by laser sealing.

When a shape-memory member is used as the compression means, it can effect a satisfactory compression function through a thermal process at a temperature at which the memorized shape is recovered. When a member that is expanded by heating is used as the compression means, a thermal process must be performed on the member at a temperature at which the member is expanded, or higher, and that is below the melting point of a separator. Further, when the elastic body that has a releasable stopper function is used, such a process is required whereby the elastic body is passed through in the temperature range where the stopper is released.

By performing the process for a temperature where the compression mechanism, or both the compression mechanism and the compression uniformizing mechanism, are fully actuated, sufficient compression to the electrodes from the inside of the battery, which is not conventionally acquired, can be provided.

The method for manufacturing the battery of the present invention will now be described in detail while referring to FIG. 10.

Figure 10:
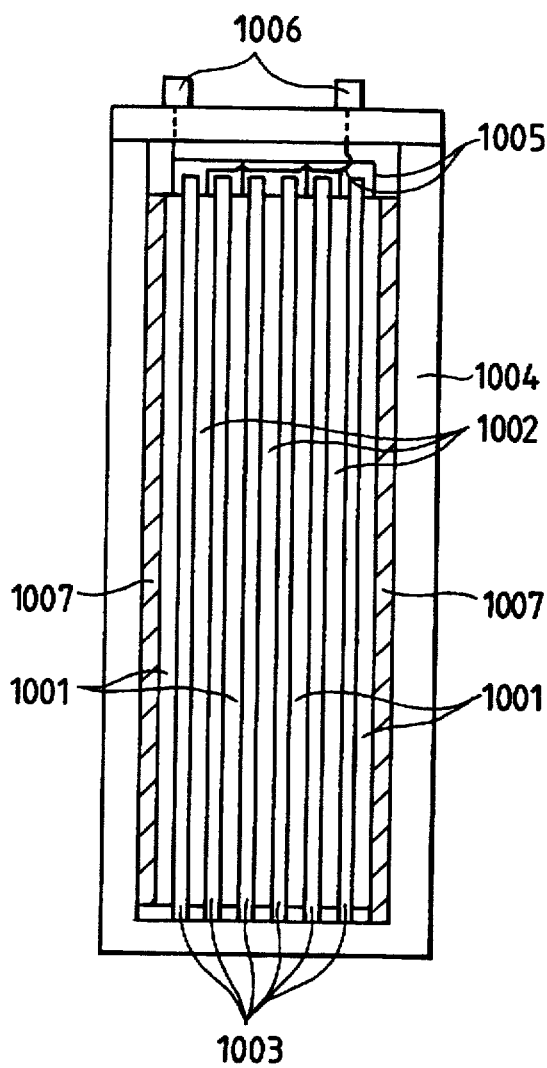
FIG. 10 is a conceptual diagram illustrating a lithium secondary battery as one example of a battery according to the present invention.

FIG. 10 is a schematic cross sectional diagram illustrating a lithium secondary battery wherein a member of the present invention whose shape is varied by temperature is employed for means for compressing the faces of the positive and negative electrodes from the inside of the battery (specifically, perpendicular to the electrode). In FIG. 10, reference numbers 1001 denote negative electrodes; 1002, positive electrodes; 1003, separators; 1004, a battery housing; 1005, collectors; 1006, battery input/output terminals; and 1007, members whose shapes are changed by temperature. An example of a manufacturing method will be described. Of course, the method of the present invention for producing a lithium secondary battery is not limited to the following example.

The lithium secondary battery according to the present invention can be provided by, for example, the following procedures. Lithium foil of the negative electrode is attached to nickel foil, which is a negative electrode collector, and the resultant structure is employed as a negative electrode. For the positive electrode, first, electrolytic manganese dioxide and lithium carbonate are mixed together at a predetermined molar ratio. The mixture is then heated at 800° C. in the atmosphere for eight hours and manganese dioxide that contains lithium is produced. Then, the lithium-containing manganese dioxide, a binder (a resin, such as poly (vinylidene fluoride), that is insoluble to an organic solution), and a conducting auxiliary agent (conductive powder, such as acetylene black) are mixed well at a predetermined weight ratio. Then, an organic solution, such as N-methyl-2-pyrrolidone is employed to make the paste of the mixture. Sequentially, the nickel foil that is a positive electrode collector is covered with that paste at a predetermined thickness by, for example, the bar coating method, and the resultant structure is dried in the atmosphere. A thermal process is performed at a predetermined temperature and under a reduced pressure to bind the lithium-containing manganese dioxide positive electrode to the positive electrode collector, which is in turn employed as a positive electrode. In addition, it is effective to press this positive electrode later to improve the collection of electricity. The molar ratio, the weight ratio, and the temperature for the thermal process may be properly set, considering materials that are used and a battery characteristic.

The negative electrode and the positive electrode that are thus produced by the above described method are separated at a predetermined size by, for example, cutting. Then, by spot welding, a conductor made of nickel foil, etc., is electrically connected as a lead electrode to each of the electrode. It should be noted that the assembling process is performed in the dehumidified atmosphere.

The compression means is manufactured by giving a shape-memory power to a Ti-Ni (1:1 at %) alloy plate, so that the plate is changed to a predetermined shape at a first temperature.

The negative electrodes and the positive electrodes with the separators intervening are inserted in a battery case, while the electrodes are sandwiched by the member that constitutes the compression means. Then, the structure is heated at a temperature of the shape-memory alloy for transformation completion when the temperature rises, or higher, to recover the shape. A predetermined amount of an electrolyte solution is injected while the pressure is applied from the inside of the battery housing.

After electrode terminals are electrically connected to corresponding electrodes, a battery housing cap is attached to the battery housing, and the housing is then tightly closed by laser sealing. Thus, a lithium battery has been manufactured.

Mode of a secondary battery

The mode of the battery of the present invention will be explained. As long as the negative electrodes and the positive electrodes are laminated with the separators intervening, any battery mode is acceptable. For example, there are a general, tightly sealed prismatic battery where an electrode group that consists of negative electrodes, separators, and positive electrodes laminated in the named order is inserted into a prismatic or a gum-shape flat housing case and the positive electrode lid is sealed by laser, or a stacking battery that has a plurality of the above electrode groups. Of course, the above battery structure is effective for a coin type battery and for a spiral cylindrical battery.

Although a lithium secondary battery has been mainly explained as an example, the problems in the prior art are also the problems for the lithium ion secondary battery. Rather, in a secondary battery called a lithium ion secondary battery, since carbon used for its negative electrode has conductivity of two digit lower than that of metal, sufficient compression to the negative and the positive electrodes is required more than any other battery. The present invention is therefore effective especially for the lithium ion secondary battery. In addition, the present invention is also effective for an alkali storage battery, such as a nickel-cadmium battery or a nickel-hydrogen-storing alloy battery, and a lead storage battery, though the effect is not as great as that acquired for the lithium secondary battery that uses an organic solvent as an electrolyte solution.

The present invention will now be described more in detail by referring to the preferred embodiments. The present invention is not limited to the following embodiments. In the embodiments, the assembly of a battery is performed in a fully dehumidified atmosphere.

(Embodiment 1)

Figure 11:
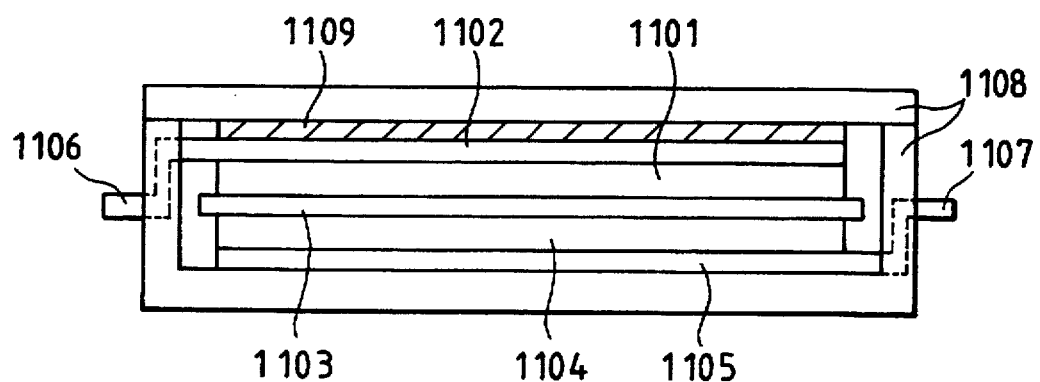
FIG. 11 is a conceptual diagram illustrating a first embodiment of the present invention.

FIG. 11 is a diagram illustrating a first embodiment of the present invention where means for compressing electrodes in a battery housing is provided (more specifically, pressure is applied to the electrodes perpendicularly to the faces of the electrodes). Reference number 1101 denotes a negative electrode; 1102, a negative electrode collector; 1103, a separator that is impregnated with an electrolyte solution; 1104, a positive electrode; 1105, a positive electrode collector; 1106, a negative electrode input/output terminal; 1107, a positive electrode input/output terminal; 1108, an insulating battery housing; and 1109, a member whose shape is varied by temperature. In this embodiment, the positive and the negative electrodes and the battery input/output terminals are insulated from the battery housing, and the battery input/output terminals are electrically connected to the corresponding collectors for the electrodes.

Lithium foil of 200 μm thick was attached to the negative electrode collector (nickel foil of 25 μm thick) 1102 and the resultant structure was employed as the negative electrode 1101. Electrolytic manganese dioxide and lithium carbonate were mixed at a molar ratio of 2:1, the mixture was heated at 800° C. in the atmosphere for eight hours, and the produced lithium-containing manganese dioxide was employed as the positive electrode 1104. Then, the lithium-containing manganese dioxide, a binder (poly(vinylidene fluoride)) and an auxiliary conducting agent (acetylene black) were mixed well at a weight ratio of 92:3:5. Then, N-methyl-2-pyrrolidone was employed as a solvent to make the paste of the mixture. Sequentially, the positive electrode collector (nickel foil of 25 μm thick) 1105 was covered with that paste by the bar coating method, and the resultant structure was fully dried in the atmosphere. A thermal process was performed at 160° C. under a reduced pressure for three hours to bind the lithium-containing manganese dioxide to the positive electrode collector 1105. A positive electrode was thus formed. The thickness of the positive electrode was 95 μm, including the positive electrode collector.

The negative and the positive electrodes that were thus formed by the above described method were cut in the size of 15 mm×50 mm. Then, by spot welding, a lead terminal (nickel foil of 25 μm thick) was formed on the reverse side of each electrode, and the structure was dried at 110° C. under the reduced pressure for three hours.

Shape-memory Ti-Ni (atomic ratio of 1:1) alloy, whose shape is memorized in advance in the above method, was used as a member 1109 whose shape is varied. The negative electrode and the positive electrode were laminated with the intervening porous polypropylene (cell guard: produced by Daicel Chemical Industries, Ltd.) 1103, and this electrode group and the member 1109 were inserted in the battery housing 1108.

Later, the lead terminals were electrically connected to the input/output terminals 1106 and 1107, respectively. To recover the shape of the shape-memory member, the structure was heated for 30 minutes at 100° C., which is a temperature for transformation completion when the temperature rises, or higher.

Finally, the separator 1103 was sufficiently impregnated with the mixture solvent (1:1) of propylene carbonate, which contains 1 mol/l of lithium tetrafluoroborate that is an electrolyte solution, and dimethoxyethane. Then, the structure was tightly sealed and a cell was thus provided.

The charging and discharging of the thus produced cell was evaluated at a 5-hour rate (2 cycles). As a result, according to the cycle initial characteristic, the charging and discharging capacity that was substantially equivalent to the capacity of the positive electrode could be obtained. On the other hand, the same evaluation test was conducted on a cell that was manufactured in the same manner except that the pressure was not applied after the electrodes were stored in the battery housing, i.e., a cell that did not recover the shape of the shape-memory member (a thermal process after the insertion of the electrodes was not performed). The obtained charging and discharging capacity was about 90% of that of the positive electrode. Further, the internal impedance of the cell produced in the above described manner was measured at 1 kHz. The internal impedance of the cell where the electrodes were compressed after being stored in the battery housing was reduced to ¼ of that of the cell where the electrodes were not compressed after being stored in the battery housing. Further, as the result of the measurement of pressure by using pressure sensitive film, the pressure exerted in the cell where the electrodes were compressed after being stored in the battery case was about 2.5 times that in the cell where the electrodes were not compressed at all.

It is assumed that the distance between the negative electrode and the positive electrode was reduced by applying pressure from the inside of the battery after the electrodes were stored therein, and the internal impedance of the battery was therefore reduced.

As is described above, when the member whose shape is varied at a desired temperature is provided in the battery housing, compression is applied to the electrodes from the inside of the battery in the facing direction, so that a lithium secondary battery where the electrodes are sufficiently compressed can be manufactured.

(Embodiment 2)

Figure 12:
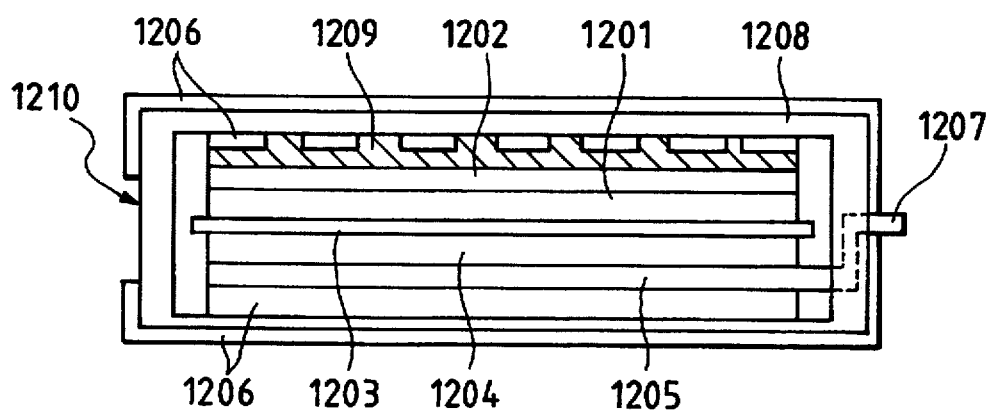
FIG. 12 is a conceptual diagram illustrating a second embodiment of the present invention.

FIG. 12 is a diagram illustrating a second embodiment of the present invention wherein is provided means for compressing electrodes so as to reduce a distance between the negative and the positive electrodes in a battery housing, and for electrically connecting a battery negative-side input/output terminal (in this embodiment, a battery housing serves also as that terminal) to a negative electrode in a battery.

Reference number 1201 denotes a negative electrode; 1202, a negative electrode collector; 1203, a separator that is impregnated with an electrolyte solution; 1204, a positive electrode; 1205, a positive electrode collector; 1206, an insulator; 1207, a positive electrode input/output terminal; 1208, a battery housing; 1209, a member whose shape is varied by temperature; and 1210, a negative electrode input/output terminal. The battery housing 1208 and the positive input/output terminal 1207 are insulated to prevent a short circuit.

Lithium foil of 200 μm thick was attached to the negative electrode collector (nickel foil of 25 μm thick) 1202 and the resultant structure was employed as the negative electrode 1201. Electrolytic manganese dioxide and lithium carbonate were mixed at molar ratio of 2:1, the mixture was heated at 800° C. in the atmosphere for eight hours, and the produced lithium-containing manganese dioxide was employed as the positive electrode 1204. Then, the lithium-containing manganese dioxide, a binder (poly(vinylidene fluoride)) and an auxiliary conducting agent (acetylene black) were mixed well at a weight ratio of 92:3:5. Then, N-methyl-2-pyrrolidone was employed as a solvent to make the paste of the mixture. Sequentially, the positive electrode collector (nickel foil of 25 μm thick) 1205 was covered with that paste by the bar coating method, and the resultant structure was fully dried in the atmosphere. A thermal process was performed at 160° C. under a reduced pressure for three hours to bind the lithium-containing manganese dioxide to the positive electrode collector 1205. A positive electrode was thus formed. The thickness of the positive electrode was 95 μm, including the positive electrode collector.

The negative and the positive electrodes that were thus formed by the above described method were cut in the size of 15 mm×50 mm. Then, by spot welding, a lead terminal (nickel foil of 25 μm thick) was formed on the reverse side of each electrode, and the structure was dried at 110° C. under the reduced pressure for three hours.

As a member 1209 whose shape is varied was employed a shape-memory Ti-Ni (atomic ratio of 1:1) alloy that memorizes in advance a bidirectional shape change, which is expanding and shrinking as is viewed from the electrodes by the above heating method. The negative electrode and the positive electrode were laminated with the intervening porous polypropylene (cell guard: produced by Daicel Chemical Industries, Ltd.) 1203. This electrode group and the member 1209 were inserted in the battery housing 1208, and the member 1209 was located between the electrodes and the internal wall of the battery housing.

Then, the lead terminal was electrically connected to the input/output terminal 1207 for a positive electrode. In this embodiment, the external housing serves also as a negative side input/output terminal. In other words, as is shown in FIG. 3A, by the shape change of the shape-memory member, the negative electrode is electrically connected to the negative-side input/output terminal.

To recover the shape of the shape-memory member, the structure was heated for 30 minutes at 100° C., which is a temperature for transformation completion when the temperature rises, or higher.

Finally, the separator 1203 was sufficiently impregnated with the mixture solvent (1:1) of propylene carbonate, which contains 1 mol/l of lithium tetrafluoroborate that is an electrolyte solution, and dimethoxyethane. Then, the structure was tightly sealed and a cell was thus provided.

The charging and discharging of thus produced cell was evaluated at a 5-hour rate. As a result, according to the cycle initial characteristic as in the first embodiment, a charging and discharging capacity that was substantially equivalent to the capacity of the positive electrode could be obtained. On the other hand, the same evaluation test was conducted on a cell where the pressure was not applied to the electrodes after being stored in the battery housing, i.e., a cell that did not recover the shape of the shape-memory member (a thermal process after the insertion of the electrodes was not performed). The cell had almost no charging and discharging power.

Further, the internal impedance of the cell produced in the above described manner was measured at 1 kHz. The internal impedance of the cell where the electrodes were compressed after being stored in the battery housing was reduced much as in the first embodiment. However, the cell where the electrodes were not compressed after being stored in the battery case was electrically disconnected. Further, as the result of the measurement of pressure by using pressure sensitive film, the pressure exerted in the cell where the electrodes were compressed after being stored in the battery case was about 2.4 times that in the cell where the electrodes were not compressed at all.

It is assumed that the distance between the negative electrode and the positive electrode was reduced by applying pressure from the inside of the battery after the electrodes were stored therein, and the internal impedance of the battery was therefore reduced. It is also assumed that there is a function for electrically connecting the electrodes in the battery to the input/output terminals. There was no charging and discharging power when the shape of the shape-memory member was not recovered because the negative electrode was electrically disconnected from the input/output terminal.

When the charging of a battery where the shape of the shape-memory member was recovered was completed, a voltage meter was connected to its positive and negative input/output terminals to heat the battery at 115° C.. The voltage meter indicated 0 V, and no actuation power occurred.

As is described above, when the member whose shape is varied at a desired temperature is provided in the battery housing, compression is applied to the electrodes from the inside of the battery in the facing direction, so that such a lithium secondary battery can be provided that the electrodes are sufficiently compressed and the battery negative-side input/output terminal (battery case in this embodiment) is electrically connected to the negative electrode in the battery. With the employment of a member whose shape is changed by temperature bidirectionally, when the temperature in the battery rises, that member is shrunk, so that the battery negative-side input/output terminal (a battery case in this embodiment) is electrically disconnected from the negative electrode of the battery. In addition, the rise of internal temperature of the battery can be prevented in advance when more current flows at a high temperature. Therefore, a more reliable lithium secondary battery can be provided.

(Embodiment 3)

Figure 13:
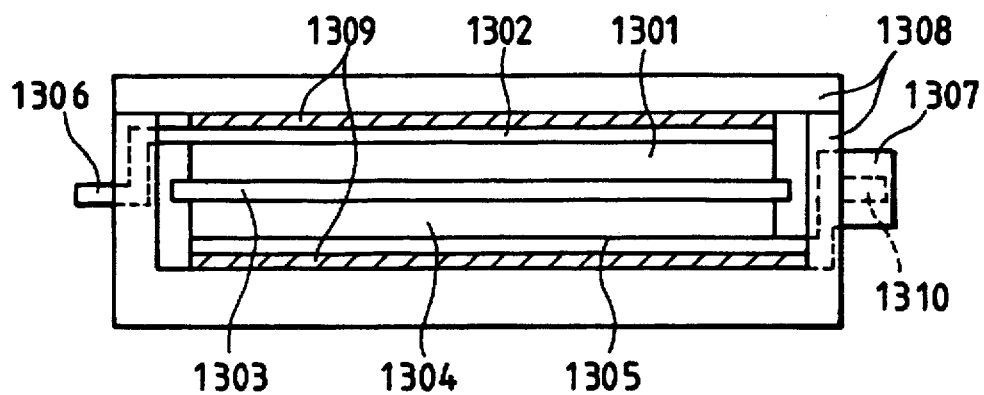
FIG. 13 is a conceptual diagram illustrating a third embodiment of the present invention.
Figure 14:
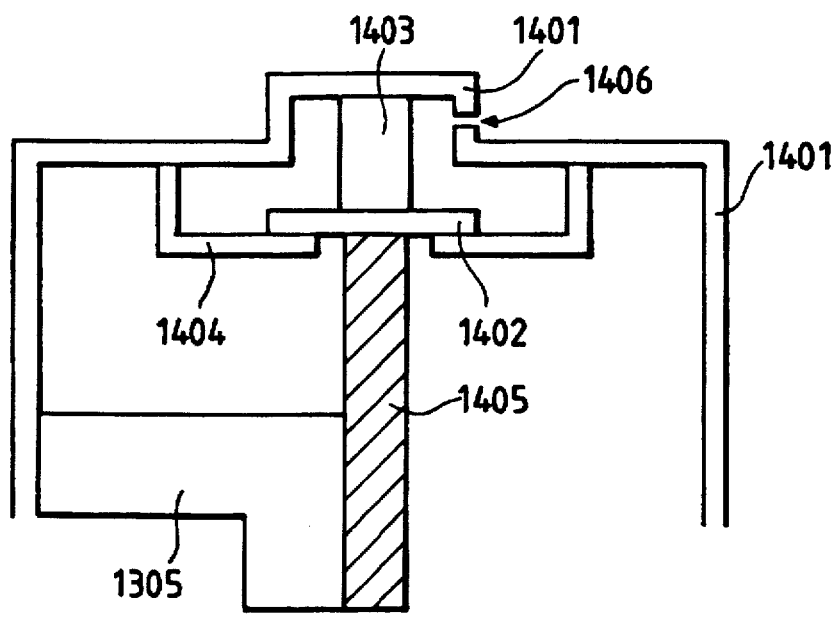
FIG. 14 is a conceptual diagram illustrating the structure of a safety valve according to the third embodiment of the present invention.

FIGS. 13 and 14 are diagrams illustrating a third embodiment of the present invention where a safety mechanism is provided that compresses the electrodes in a battery case perpendicular to the electrode faces and that has its shape changed by temperature.

Reference number 1301 denotes a negative electrode; 1302, a negative electrode collector; 1303, a separator that is impregnated with an electrolyte solution; 1304, a positive electrode; 1305, a positive electrode collector; 1306, a negative electrode input/output terminal; 1307, a positive electrode input/output terminal; 1308, an insulating battery housing; 1309, a member whose shape is varied by temperature; and 1310, a safety valve.

In this embodiment, the positive and the negative electrodes and the battery input/output terminals are insulated from the battery case, and the collector for each electrode is electrically connected to the corresponding input/output terminal by compressing the terminals as is shown in FIG. 2A. The shape (the same as in FIG. 2B) at 115° C. where electrically disconnection occurs was memorized in advance by the member 1309.

Lithium foil of 200 μm thick was attached to the negative electrode collector (nickel foil of 25 μm thick) 1302 and the resultant structure was employed as the negative electrode 1301. Electrolytic manganese dioxide and lithium carbonate were mixed at molar ratio of 2:1, the mixture was heated at 800° C. in the atmosphere for eight hours, and the produced lithium-containing manganese dioxide was employed as the positive electrode 1304. Then, the lithium-containing manganese dioxide, a binder agent (poly(vinylidene fluoride)) and an auxiliary conducting agent (acetylene black) were mixed well at a weight ratio of 92:3:5. Then, N-methyl-2-pyrrolidone was employed as a solvent to make the paste of the mixture. Sequentially, the positive electrode collector (nickel foil of 25 μm thick) 1305 was covered with that paste by the bar coating method, and the resultant structure was fully dried in the atmosphere. A thermal process was performed at 160° C. under a reduced pressure for three hours to bind the lithium-containing manganese dioxide to the positive electrode collector 1305. A positive electrode was thus formed. The thickness of the positive electrode was 95 μm, including the positive electrode collector.

The negative and the positive electrodes that were thus formed by the above described method were cut in the size of 15 mm×50 mm. Then, by spot welding, a lead terminal (nickel foil of 25 μm thick) was formed on the reverse side of each electrode, and the structure was dried at 110° C. under the reduced pressure for three hours.

Shape-memory Ti-Ni (atomic ratio of 1:1) alloy, whose shape is memorized in advance in the above method, was used as a member 1309 whose shape is varied. The negative electrode and the positive electrode were laminated with the intervening porous polypropylene (cell guard: produced by Daicel Chemical Industries, Ltd.). This electrode group and the member 1309 were inserted in the battery housing 1308 so that the member 1309 was provided between the electrodes and the internal wall of the battery. In addition, in this embodiment, the above structured shape-memory alloy was also employed as a member for controlling the actuation of the safety valve 1310, as is shown in FIGS. 5A to 5D. By performing the heating process, the reversibility in change was provided for the shape-memory alloy that served as the member for controlling the actuation of the safety valve 1310.

FIG. 14 is an enlarged diagram showing the structure of the safety valve 1310 in this embodiment. Reference number 1401 denotes a positive electrode cap; 1402, a sealing plate; 1403, an elastic body; 1404, a safety valve; 1405, a shape-memory alloy on which shape-memory processing is performed and that is a member for controlling the safety valve 1404 so as to be actuated at 120° C.; and 1406, a gas escape port. According to the above described operational principle, the mechanism actuates the safety valve 1404 when the shape of the shape-memory alloy is changed by temperature.

Then, to recover the shape of the shape-memory member that is the compression means, the structure was heated for 30 minutes at 100° C., which is a temperature for transformation completion when the temperature rises, or higher.

Finally, the separator 1303 was sufficiently impregnated with the mixture solvent (1:1) of propylene carbonate, which contains 1 mol/l of lithium tetrafluoroborate that is an electrolyte solution, and dimethoxyethane. Then, the structure was tightly sealed and a cell was thus provided.

The charging and discharging evaluation was conducted for a 5-hour rate on the cell that was produced in the above described manner. As a result, the electrode compression means in this embodiment was the same as in the first embodiment, and according to the cycle initial characteristic, the charging and discharging power capacity was equivalent to that of the positive electrode, as in the first embodiment. As is described above, in this embodiment, in addition to the compression means, means for actuating the safety valve of safety means that is controlled by temperature is also provided. Therefore, when the cell was heated at 115° C., no value for a battery voltage was indicated (the safety valve was not actuated at this time). When the cell was continuously heated at 120° C., the cell was examined while the temperature was maintained. The safety valve of each cell that was examined was found to be actuated.

In addition, the cell was heated at 115° C. and the cell with electric disconnection was left until its temperature had returned to room temperature. The cell had the same battery characteristic as that before it was heated. It was confirmed that the cell had the automatic recovery function.

It is assumed that the distance between the negative electrode and the positive electrode was reduced by applying pressure from the inside of the battery after the electrodes were stored therein, and the internal impedance of the battery was therefore reduced. It is also assumed that the cell has a function for electrically disconnecting the electrodes in the battery from the input/output terminals in consonance with the battery temperature and a function for controlling the actuation of the safety valve.

As is described above, a member whose shape is varied by a desired temperature is provided in the battery housing. A lithium secondary battery can be therefore manufactured in which the electrodes can be sufficiently compressed from the inside of the battery (more specifically, in the direction in which a distance between the negative electrode and the positive electrode is reduced) and also the actuation of the safety valve can be controlled by temperature, in addition to the internal pressure of the battery.

(Embodiment 4)

In this embodiment, a carbon material is used for a negative electrode and the compression means as in the first embodiment is provided.

In this embodiment, for evaluation of a secondary battery characteristic, a cell for testing was assembled in the same manner as in the first embodiment, except that mesophase carbon microbeads (MCMB produced by Osaka Gas Co., Ltd.) was employed for the negative electrode material, instead of the lithium foil.

The negative electrode employed in this embodiment was formed by the following procedures. First, mesophase carbon microbeads and a binder (poly(vinylidene fluoride) powder) were mixed well at the weight ratio of 95:5, and N-methyl-2-pyrrolidone was used to make a paste of the mixture. That paste was coated on the negative electrode collector (copper foil of 35 μm thick) and was dried completely at room temperature. A thermal process was performed at 160° C. under the reduced pressure for three hours to affix the paste to the collector. The electrode was thus formed.

The evaluation of a 5-hour rate was conducted as in the first embodiment. The compression force applied to the electrodes was about 2.6 times that of the cell where the shape of the member was not changed. However, the internal impedance of the battery was about 1.5 times as high as that in the first embodiment. It is assumed that because the conductivity of carbon, which was the negative electrode, is about 2-digit lower than that of the metal, under the same compression force, the internal impedance of the battery could not be maintained sufficiently low, compared with the first embodiment where metal (lithium) was employed for the negative electrode.

There is no problem for practical use in the charging and discharging capacity of the battery where the electrodes are compressed. Actually, this capacity was about 3 times the charging and discharging capacity of the cell where the electrodes were not compressed, and it was obvious that the compression applied to the electrodes was very effective. This result is due to the low conductivity of carbon that was employed as the negative electrode. In other words, the compression means of the present invention is effective especially for a lithium ion battery that has low conductivity in the negative electrode.

(Embodiment 5)

In this embodiment, a member that generates gas by heating and is not returned to its original shape is employed as a member that constitutes the compression means.

The same evaluation as in the first embodiment was conducted, except that material that generates gas at a temperature lower than the melting point of the separator was dispersed in polyethylene in order to be employed as means for compressing the laminated electrodes after they were stored in the battery housing.

As means for compressing the laminated electrodes in the battery housing after they were stored therein, the following method was used to form a member that was decomposed, generated gas, and was expanded at a temperature lower than the melting point of the separator.

The negative electrode and the positive electrode were fabricated in the same manner as in the first embodiment. A material (sodium hydrogencarbonate), which, by heating, generates gas toward the non-opposite face of each electrode, and a binder were mixed at a volume ratio of 1:1. The mixture was formed into a paste by using N-methyl-2-pyrrolidone and affixed.

The resultant structure was stored in the battery case in the same manner as in the first embodiment. Then, sodium hydrogencarbonate was foamed by heating at 100° C. to further compress the laminated electrodes in the battery case. Following this, a drying process under the reduced pressure was performed.

The charging and discharging of the thus produced cell was evaluated at a 5-hour rate. As a result, according to the cycle initial characteristic, the charging and discharging capacity was about 95% of the capacity of the positive electrode. On the other hand, the same evaluation test was conducted on a cell in which the pressure was not applied and the temperature was increased after the electrodes were stored in the battery housing, i.e., a cell where the compression means was not expanded (a thermal process after the insertion of the electrodes was not performed). The obtained charging and discharging capacity was about 90% of that of the positive electrode. Further, the internal impedance of the cell produced in the above described manner was measured at 1 kHz. The internal impedance of the cell where the electrodes were compressed after being stored in the battery case was reduced to ⅓ of that of the cell where the electrodes were not compressed after being stored in the battery housing. Further, as the result of the measurement of pressure by using pressure sensitive film, the pressure exerted in the cell where the electrodes were compressed after being stored in the battery housing was about 2.0 times that in the cell where the electrodes were not compressed at all.

It is assumed that the member that generates gas and is expanded at a temperature lower than the melting point of the separator and that was employed as a member for the means for compressing electrodes in this embodiment has lower strength than that of the shape-memory alloy that was employed in the first embodiment, and thus it was difficult to compress the electrodes.

As is apparent from the charging and discharging characteristic, this member does not have a critical problem for practical use and is actually usable. Further, in this embodiment, all the materials that were used as a member that constitutes the means for compressing electrodes are common materials. Since there is no particular material employed, the costs for material is low. For the manufacture, since the electrode compression means can be fabricated simply by dispersing a foaming agent in an ordinary resin, the cell can be easily fabricated by using simple procedures. Since the resin is expanded along the raised and recessed portions of the electrodes that contact the compression means, the pressure can be applied more uniformly by this resin than by the shape-memory alloy in the first embodiment. After the fabrication of the battery is completed, the compression means is actuated by heating and the generated gas is discharged through the safety valve. In this manner, the operation of the safety valve can be confirmed.

Instead of the dispersion of sodium hydrogencarbonate in a polyethylene resin, sodium hydrogencarbonate was sealed in polyfluorocarbon to use this as the compression means. A cell was fabricated in the same manner and evaluation was conducted. As a result, the charging and discharging capacity was about 93% of the theoretical capacity of the positive electrode. Further, the pressure that was applied to the electrodes was measured by using a pressure sensitive sheet. The pressure was about 15% lower than that for the case where sodium hydrogencarbonate was dispersed in a polyethylene resin, but the pressure was uniformly applied across the surfaces of the electrodes. It is assumed that the portion of the compression means that contacts the electrodes was made of rubber, and the shape could be more easily changed along the raised and recessed portions of the electrodes, so that the pressure was applied more uniformly. As is described above, when rubber is employed as a member that constitutes the compression member, the pressure can be uniformly applied even though its magnitude is reduced a little.

Considering the results obtained in this embodiment and the first embodiment, it is apparent that the increase in the charging and discharging capacity is affected by compressing the laminated electrodes in the battery housing after they are stored therein.

(Embodiment 6)

In this embodiment, an elastic body that has a stopper function for releasing the pressure of the elastic body is employed as a member that constitutes the compression means.

A secondary battery was fabricated in the same manner as in the first embodiment, except that the elastic body that has a pressure releasable stopper function is used as the compression means.

In other words, by the following method, the elastic body that has the stopper function for releasing the pressure of the elastic body after the storage of the electrodes was fabricated as means for compressing the electrodes after they were stored in the battery case.

A stainless steel leaf spring is located on the side opposite to the laminated electrodes in a battery case. A titanium plate 100 μm thick and a shape-memory alloy, whose shape is changed at 100° C. and that functions as a stopper, were attached to the leaf spring, which is an elastic body disposed at the gap between the battery case and the electrodes, as is shown in FIGS. 7A and 7B.

Then, the resultant structure was stored in the battery case with the same method as in the first embodiment, and heated at 100° C. The stopper function was released and the laminated electrodes were compressed in the battery case.

The charging and discharging of the thus produced cell was evaluated at a 5-hour rate. As a result, according to the cycle initial characteristic, the charging and discharging capacity was about 98% of the capacity of the positive electrode. On the other hand, the same evaluation test was conducted on a cell to which the pressure was not applied and the temperature was increased after the electrodes were stored in the battery housing, i.e., a cell that employs the shape-memory alloy and did not release the stopper means (a thermal process after the insertion of the electrodes was not performed). The obtained charging and discharging capacity was about 90% of that of the positive electrode. Further, the internal impedance of the cell produced in the above described manner was measured at 1 kHz. The internal impedance of the cell where the electrodes were compressed after being stored in the battery housing was reduced to ¼ of that of the cell where the electrodes were not compressed after being stored in the battery housing. Further, as the result of the measurement of pressure by using pressure sensitive film, the pressure exerted in the cell where the electrodes were compressed after being stored in the battery housing was about 3.0 times of that in the cell where the electrodes were not compressed at all.

A member that was used as the compression means in this embodiment has stopper means in addition to, for example, a stainless steel leaf spring, which is conventionally used as an elastic body. Compared with the other previously described members that constitute the compression means (e.g., a shape-memory member and a member that generates gas and expands when heated and is not returned to its original shape), this member requires one more item (specifically, stopper means). However, the member (leaf spring) that is employed as an elastic spring is a material that is conventionally employed for springs, and that has sufficient strength and elastic force for compressing the electrodes. From the view of the reduction of a distance between the negative and the positive electrodes by compression applied to the electrodes in the battery and the decrease of the internal impedance of the battery, it is therefore very effective for the elastic body in this embodiment that has the stopper means for releasing pressure of the elastic body to be used as the compression means. This means is especially effective for a battery that employs a comparatively low conductive electrode (e.g., carbon electrode) or a comparatively low electrolyte solution. Further, the amount of the auxiliary conducting agent that is added in the electrode (e.g., the positive electrode) can be reduced, and the battery capacity density can be increased.

From the results of the embodiment, it is also apparent that means for compressing the laminated electrodes in the battery housing after they are stored therein is very effective for increasing the charging and discharging capacity.

(Embodiment 7)

Figure 15:
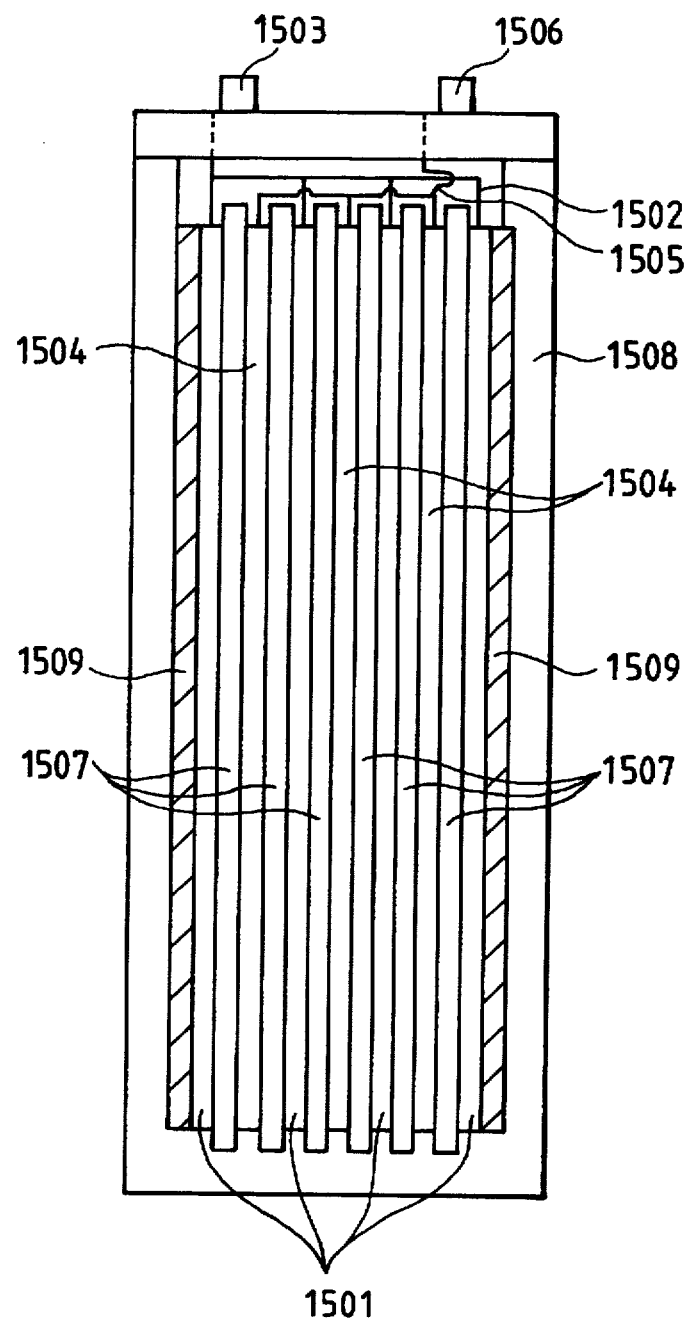
FIG. 15 is a conceptual diagram illustrating a seventh embodiment of the present invention.

FIG. 15 is a diagram illustrating a seventh embodiment of the present invention where means is provided for compressing electrodes in a battery housing (more specifically, perpendicular to the faces of the electrodes so as to reduce the distance between the electrodes), and for releasing the pressure by temperature.

A plurality of negative electrodes and positive electrodes are laminated, and components except for a member 1509 are the same as those fabricated in the first embodiment. Reference number 1501 denotes a negative electrode; 1502, a negative electrode collector; 1503, a negative-side input/output terminal; 1504, a positive electrode; 1505, a positive electrode collector; 1506, a positive-side input/output terminal; 1507, a separator that is impregnated with an electrolyte solution; 1508, an external housing as an insulating battery housing; and 1509, a member (shape-memory alloy) whose shape is changed by temperature.

In this embodiment, the positive and the negative electrodes and the battery input/output terminals are insulated from the battery housing, and the collectors for the electrodes are electrically connected to the corresponding battery input/output terminals.

As is shown in FIG. 15, in this embodiment, a plurality of the negative electrodes and the positive electrodes are laminated with the intervening separators to form an electrode group. The electrode group is inserted in the external housing, and then is connected to the individual terminals. Thus, a prismatic sealed cell was fabricated.

The procedures for fabricating electrodes are almost the same as those in the first embodiment. In this embodiment, the laminated electrodes were inserted in the external housing while they were being compressed. Means for further compressing the electrodes in the battery housing was formed following the procedures in the first embodiment. It should be noted that a shape-memory alloy employed in this embodiment is Ti-Ni (atomic ratio of 49:51). In the aforementioned thermal process, the bidirectional shapes for expansion and shrinking were memorized.

The evaluation for the charging and discharging capacity of the positive electrode of the thus fabricated cell was conducted at a 10-hour rate, a 5-hour rate, and a 3-hour rate. The charging and discharging capacities at the respective hour rates were 98%, 95%, and 91% with respect to the theoretical capacity of the positive electrode. Compared with a battery where the electrodes were not compressed (the shape of the shape-memory alloy was not recovered though it was inserted in the housing), the internal impedance of the battery of the cell in this embodiment was about ⅓ and the pressure applied to the electrodes was about 2.4 times.

It is apparent from the results of the charging and discharging test that the cell in this embodiment has sufficient charging and discharging power.

Further, to confirm that the electrodes can easily separated from the battery housing by releasing the pressure to facilitate recycling, the following tests were conducted on a plurality of cells that were fabricated in this embodiment.

In this embodiment, the ends of the fabricated cells before and after evaluation were cut off perpendicular to the face of the electrode and flash on the cut face was removed. Then, the cell was cooled at the temperature of liquid nitrogen. Regardless of whether the cells were before evaluation or after, the electrodes could easily be removed from the battery housing merely by reversing the cells and providing mechanic vibration. On the other hand, as for the cells that were cut along the center axis but were not cooled at the temperature of liquid nitrogen, even when the flash of the cut face was removed and the cell was reversed and mechanically vibrated, the electrodes could not be removed.

That is, the member, employed in this embodiment, whose shape is changed by temperature was shrunk by cooling at a liquid nitrogen temperature, so that the electrodes were easily removed. It was found that a lithium secondary battery that can be easily recycled can be provided.

(Embodiment 8)

Figure 16:
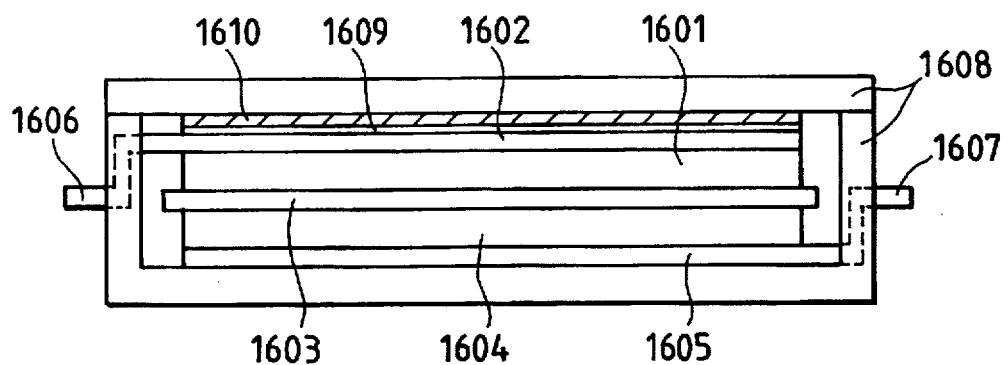
FIG. 16 is a conceptual diagram illustrating an eighth embodiment of the present invention.
Figure 17A:
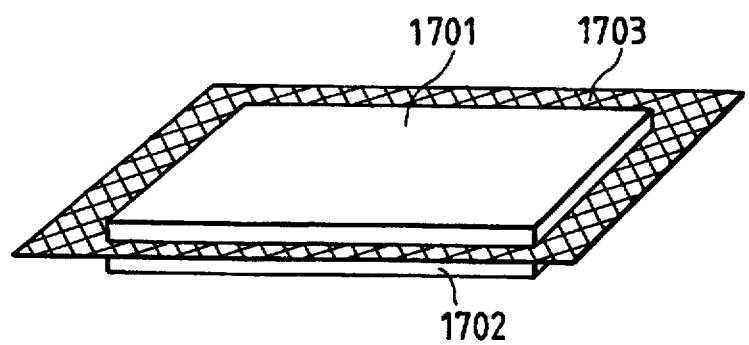
FIGS. 17A and 17B are conceptual diagrams illustrating an example structure wherein negative electrodes and positive electrodes are laminated via separators.
Figure 17B:
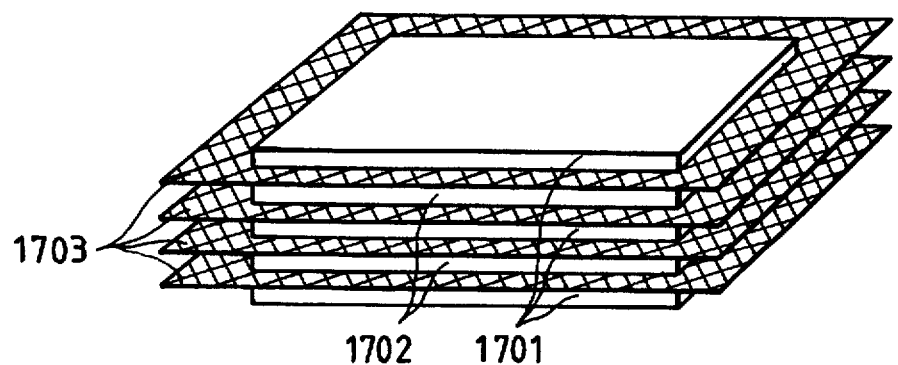
Figure 18A:
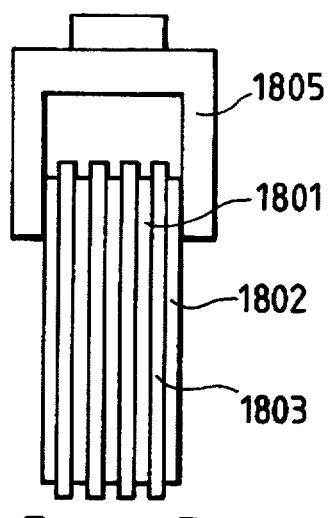
FIGS. 18A through 18C are conceptual diagrams illustrating an example of a method wherein electrodes are inserted into a battery case.
Figure 18B:
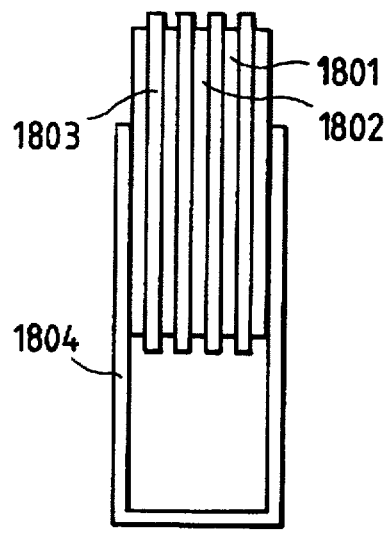
Figure 18C:
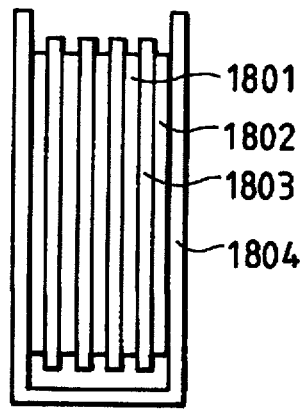

FIG. 16 is a diagram illustrating an eighth embodiment of the present invention that has means for compressing electrodes in a battery housing (specifically, compressing electrodes perpendicularly to the faces of the electrodes so as to reduce a distance between the electrodes) and means for uniformizing the pressure.

Reference number 1601 denotes a negative electrode; 1602, a negative electrode collector; 1603, a separator that is impregnated with an electrolyte solution; 1604, a positive electrode; 1605, a positive electrode collector; 1606, a negative electrode input/output terminal; 1607, a positive electrode input/output terminal; 1608, an insulating battery housing; and 1609, compression uniformizing means; and 1610, compression means.

In this embodiment, the positive and the negative electrodes and the battery input/output terminals are insulated from the battery case, and the battery input/output terminals are electrically connected to the corresponding collectors for the electrodes.

Lithium foil of 200 μm thick was attached to the negative electrode collector (nickel foil of 25 μm thick) 1602 and the resultant structure was employed as the negative electrode 1601. Electrolytic manganese dioxide and lithium carbonate were mixed at a molar ratio of 2:1, the mixture was heated at 800° C. in the atmosphere for eight hours, and the produced lithium-containing manganese dioxide was employed as the positive electrode 1604. Then, the lithium-containing manganese dioxide, a coupling agent (poly (vinylidene fluoride)) and an auxiliary conducting agent (acetylene black) were mixed well at a weight ratio of 92:3:5. Then, N-methyl-2-pyrrolidone was employed as a solvent to make a paste of the mixture. Sequentially, the positive electrode collector (nickel foil of 25 μm thick) 1605 was covered with that paste by the bar coating method, and the resultant structure was fully dried in the atmosphere. A thermal process was performed at 160° C. under a reduced pressure for three hours to bind the lithium-containing manganese dioxide to the positive electrode collector 1605. A positive electrode was thus formed. The thickness of the positive electrode was 95 μm, including the positive electrode collector 1605.

The negative and the positive electrodes 1601 and 1604 that were thus formed by the above described method were cut in a 60-mm square size. Then, by spot welding, a lead terminal (nickel foil of 25 μm thick) was formed on the reverse side of each electrode. Further the reverse face of the negative electrode was covered with wax, and was dried at room temperature in the atmosphere. Then, the structure was dried at 110° C. under the reduced pressure for three hours.

Next, by the thermal process, means for compressing the electrodes in the battery housing perpendicularly to the faces of the electrodes was formed of Ti-Ni (atomic ratio of 1:1) that is a shape-memory alloy. A secondary battery was fabricated by the following procedures using the shape-memory alloy, which is the means for compressing the electrodes in the direction in which the electrodes face after they are stored in the battery housing.

The negative electrodes and the positive electrodes were laminated with the separators (porous polypropylene of 20 μm (product name: cell guard produced by Daicel Chemical Industries, Ltd.)). The laminated electrodes were inserted into the battery housing with the compression means and the compression uniformizing means.

Thereafter, the lead terminals were electrically connected to the input/output terminals 1606 and 1607. After the compression uniformizing means was fluidized at 90° C., the shape of the shape-memory member that is the compression means was recovered. Then, the thermal process was performed at 100° C. for 30 minutes to apply more pressure to the electrodes. Finally, the separator 1603 was sufficiently impregnated with the mixture solvent (1:1) of propylene carbonate, which contains 1 mol/l of lithium tetrafluoroborate that is an electrolytic solution, and dimethoxyethane. Then, the structure was tightly sealed and a cell was thus provided.

The evaluation for the charging and discharging of the cell that was fabricated by the above described method was conducted at a 5-hour rate. As a result, according to the cycle initial characteristic, the charging and discharging capacity that is almost equivalent to that of the positive electrode was obtained.

A secondary battery with larger electrode areas was fabricated by the same method and evaluated. The reduction of the discharging capacity due to the increase of the electrode area was not observed. Further, pressure that was actually applied to the electrodes was measured by using pressure sensitive film at a plurality of portions of the cells at pitches of about 10 mm and in the range of 5 mm square in the diagonal direction of the electrodes. When the results were averaged, the minimum pressure value/the maximum pressure value were as is shown in Table 1. More specifically, in the cell where, as the compression uniformizing means, the member that is fluidized at the melting point of the separator or lower is located between the outermost electrode and the battery housing, the uniform compression was realized as is described above, so that there was no big difference between the maximum and the minimum pressure values due to the increase in the electrode area. On the other hand, in the cell that did not have compression uniformizing means, as the electrode area was increased, the uniformity of pressure was found to be reduced.

TABLE 1

| Electrode Size | Minimum Pressure Value/ Maximum Pressure Value | |
|---|---|---|
| | Compression Uniformizing Means Present | Compression Uniformizing Means Absent |
| 60 mm × 60 mm | 0.98 | 0.98 |
| 60 mm × 100 mm | 0.97 | 0.96 |
| 60 mm × 250 mm | 0.96 | 0.93 |
| 100 mm × 100 mm | 0.98 | 0.91 |
| 250 mm × 250 mm | 0.97 | 0.88 |

It is therefore assumed that, if a member (wax in this embodiment) that is fluidized at the melting point of the separator or lower is located at the outermost portion of the electrode group where the positive and the negative electrodes are laminated with the intervening separators, pressure is uniformly applied even at an increased electrode area, and thus the discharging capacity will not be reduced.

In a secondary battery where a member that is fluidized at the melting point of the separator or lower is not located, as the electrode area is increased, the charging capacity tends to be reduced. It is assumed that the pressure is not uniformly applied to the negative and the positive electrodes and only the portions that are comparatively compressed contribute to the charging and discharging, so that as the electrode area is increased to make uniform compression difficult, the charging and discharging capacity will be reduced.

As is described above, the secondary battery of the present invention provides the following effects.

1. The electrodes can be sufficiently compressed in the battery case perpendicular to the electrode face, and the internal impedance can be extremely reduced. Further, by using the compression uniformizing means, a distance between the electrodes can be shortened. More specifically, the pressure applied perpendicularly to the electrode face is more uniformized and the internal impedance can be decreased more. As a result, a battery that has excellent charging and discharging power can be provided.

The contact portion of the battery input/output terminals and the electrodes can be compressed sufficiently, and the internal impedance can be reduced.

2. In consonance with the battery internal temperature, electric connection between the battery input/output terminal for a positive electrode and the positive electrode in the battery and/or between the battery input/output terminal for a negative electrode and the negative electrode in the battery can be cut off. Further, the safety valve can be actuated in consonance with the battery internal temperature. Thus, a more reliable battery can be provided.

3. Since a member of the present invention whose change is varied can accomplish the electric connection between the battery input/output terminals and the electrodes, the manufacturing procedure can be simplified, such as the shortening of the spot welding procedure, and welded points are eliminated, so that a battery that can be easily recycled after used can be provided. In addition, as the pressure applied to the electrodes can be released, a battery that is proper for recycling can be provided.

According to the method of the present invention for manufacturing a battery, it is possible to consistently manufacture a battery with good yields, wherein electrodes are satisfactorily compressed from the inside of the battery, which is not performed conventionally, and the internal impedance is reduced, that has excellent charging and discharging power and high safety.

What is claimed is:

1. A battery comprising, in a battery housing:
   positive electrodes and negative electrodes, which are disposed with intervening separators,
   a solid electrolyte or an electrolyte solution,
   a safety valve, and
   a member whose shape is altered:
      wherein said member has a shape that is altered at a predetermined first temperature which is a lower temperature than a melting point of said separators;
      said member retains said altered shape at temperatures which fall within an operating temperature range of said battery;
      said member can be heated to said first temperature to exert pressure in at least one area within said battery housing or can be cooled to release said exerted pressure; and
      wherein, when said shape of said member is altered, said safety valve in said battery housing is actuated.

2. A battery according to claim 1, wherein said negative electrodes upon charging contain at least lithium as an active material, and a non-aqueous solution is employed as said electrolyte solution.

3. A battery according to claim 1, wherein said operating temperature range is from −30° C. to 80° C.

4. A battery according to claim 1, wherein said negative electrodes and said positive electrodes are fixed to a negative collector and a positive collector, respectively, and are connected to input and output terminals of said negative and said positive collectors.

5. A battery according to claim 2, wherein said negative electrodes and said positive electrodes are fixed to a negative collector and a positive collector, respectively, and are connected to input and output terminals of said negative and said positive collectors.

6. A battery according to claim 3, wherein said negative electrodes and said positive electrodes are fixed to a negative collector and a positive collector, respectively, and are connected to input and output terminals of said negative and said positive collectors.

7. A battery according to claim 1, further comprising an elastic body and stopper means for suppressing elastic force of said elastic body, with said stopper means being constituted by said member.

8. A battery according to claim 1, wherein, as the shape of said member is altered, pressure is exerted in a direction in which a distance between said positive said negative electrodes is reduced.

9. A battery according to claim 8, wherein said member is provided between the internal wall of said battery housing and said positive electrode and/or said negative electrode, or between said positive and said negative electrodes if a plurality of said electrodes are located, and/or wherein said member constitutes said battery housing.

10. A battery according to claim 1, wherein, as said shape of said member is altered, said positive electrodes (or said positive collector) become electrically connected to said input/output terminals for positive electrodes and/or said negative electrodes (or said negative collector) become electrically connected to said input/output terminals for negative electrodes.

11. A battery according to claim 1, wherein said member is formed of an alloy or a resin that has a shape-memory function.

12. A battery according to claim 11, wherein said member is formed of a shape-memory alloy.

13. A battery according to claim 1, wherein said member is made of a material whose volume is expanded at said first temperature.

14. A battery according to claim 13, wherein said material generates a gas as its volume is expanded.

15. A battery according to claim 1, wherein said member is made of material that assumes an altered shape at said first temperature and then altered shape at a second temperature that falls outside said operating temperature range.

16. A battery according to claim 8, wherein said member is made of a material that assumes one shape at said first temperature and that then assumes a different shape at said a second temperature that falls outside said operating temperature range, and wherein due to the change in the shape of said member at said second temperature, pressure that is exerted in a direction opposite to said electrodes is released, or the actuation of said safety valve that is provided in said battery housing ceases.

17. A battery according to claim 9, wherein said member is made of a material that assumes one shape at said first temperature and that then assumes a different shape at a second temperature that falls outside said operating temperature range, and wherein due to the change in the shape of said member at said second temperature, pressure that is exerted in a direction opposite to said electrodes is released, or the actuation of said safety valve that is provided in said battery housing ceases.

18. A battery according to claim 10, wherein said member is made of a material that assumes one shape at said first temperature and that then assumes a different shape at a second temperature that falls outside said operating temperature range, and wherein, due to the change in the shape at said second temperature, the electric connection of said positive electrodes (or said positive collector) to said input/output terminals for positive electrodes is interrupted, and/or the electric connection of said negative electrodes (or said negative collector) to said input/output terminals for negative electrodes is interrupted.

19. A battery according to claim 18, wherein a second member that is different from said member and whose shape is varied by temperature is provided, and wherein said safety valve in said battery housing is actuated as said shape of said second member is changed and a temperature at which said safety valve is actuated is raised so that said temperature is higher than said second temperature.

20. A battery according to claim 1, wherein said member is made of a material that assumes one shape at said first temperature and that then assumes a different shape at a second temperature that falls outside said operating temperature range, and wherein the actuation of said safety valve in said battery housing is halted as said shape of a second member is changed.

21. A battery according to claim 15, wherein the altered shapes that said member assumes at said first temperature and at said second temperature are reversible.

22. A battery according to claim 1, further comprising compression uniformizing means for the uniform exertion of pressure.

23. A battery according to claim 22, wherein said compression uniformizing means is made of a material that acquires a state of flowability at a temperature that is lower than a melting point of said separators, and that does not react, or is processed so as not to react, with said solid electrolyte and said electrolytic solution.

24. A battery according to claim 22, wherein said compression uniformizing mean is located between said member and said electrodes in said battery housing.

25. A method for manufacturing a battery, wherein positive electrodes and negative electrodes are disposed with intervening separators and such a resultant structure is stored in a battery housing, along with a solid electrolyte or an electrolyte solution, comprising the steps of:

storing, in said battery housing, at least said positive electrodes, said negative electrodes, said separators, and a member whose shape is altered at a temperature (a first temperature) that is lower than a melting point of said separators and that retains said altered shape at temperatures that fall within said operating temperature range; and heating or cooling a resultant structure at said first temperature that differs from a temperature that exists at such time as storing is accomplished.

26. A method for manufacturing a battery according to claim 25, further comprising the step of providing compression uniformizing means in said member.

27. A method for manufacturing a battery according to claim 25, wherein negative electrodes that contain lithium upon operating charging as an active material are employed as said negative electrodes, that a nonaqueous electrolyte solution are employed as said electrolyte solution, and that production procedures are performed in an atmosphere that provides for adequate removal of water.

28. A method for manufacturing a battery according to claim 26, wherein negative electrodes that contain lithium upon operating charging as an active material are employed as said negative electrodes, that a nonaqueous electrolyte solution are employed as said electrolyte solution, and that production procedures are performed in an atmosphere that provides for adequate removal of water.

29. A battery comprising, in a battery housing:

positive electrodes and negative electrodes, which are disposed with intervening separators, a solid electrolyte or an electrolyte solution, and a member whose shape is capable of being altered;

wherein said member has a shape that is altered at a predetermined first temperature which is a lower temperature than a melting point of said separators;

said member retains said altered shape at temperatures which fall within an operating temperature range of said battery;

said member can be heated to said first temperature to exert pressure in at least one area within said battery housing, and wherein, when said shape of said member is altered, said electrodes are compressed in a direction that is perpendicular to the faces of said electrodes.

30. A battery according to claim 29, wherein said negative electrode upon charging contain at least lithium as an active material, and a nonaqueous solution is employed as said electrolyte solution.

31. A battery according to claim 29, wherein said operating temperature range is from −30° C. to 80° C.

32. A battery according to claim 29, wherein said negative electrodes and said positive electrodes are fixed to a negative collector and a positive collector, respectively, and are connected to input and output terminals of said negative and said positive collectors.

33. A battery according to claim 30, wherein said negative electrodes and said positive electrodes are fixed to a negative collector and a positive collector, respectively, and are connected to input and output terminals of said negative and said positive collectors.

34. A battery according to claim 31, wherein said negative electrodes and said positive electrodes are fixed to a negative collector and a positive collector, respectively, and are connected to input and output terminals of said negative and said positive collectors.

35. A battery according to claim 29, further comprising an elastic body and stopper means for suppressing elastic force of said elastic body, with said stopper means being constituted by said member.

36. A battery according to claim 29, wherein, as the shape of said member is altered, said pressure is exerted in a direction in which a distance between said positive and said negative electrodes is reduced.

37. A battery according to claim 36, wherein said member is provided between the internal wall of said battery housing and said positive electrode and/or said negative electrode, or between said positive and said negative electrodes if a plurality of said electrodes are located, and/or wherein said member constitutes said battery housing.

38. A battery according to claim 29, wherein, as said shape of said member is altered, said positive electrodes or said positive collector become electrically connected to said input/output terminals for positive electrodes and/or said negative electrodes or said negative collector become electrically connected to said input/output terminal for negative electrodes.

39. A battery according to claim 29, wherein said member is formed of an alloy or a resin that has a shape-memory function.

40. A battery according to claim 39, wherein said member is formed of a shape-memory alloy.

41. A battery according to claim 29, wherein said member is made of a material whose volume is expanded at said first temperature.

42. A battery according to claim 41, wherein said material generates a gas as its volume is expanded.

43. A battery according to claim 29, wherein said member is made of material that assumes an altered shape at said first temperature and then altered shape at a second temperature that falls outside said operating temperature range.

44. A battery according to claim 36, wherein said member is made of a material that assumes one shape at said first temperature and that then assumes a different shape at a second temperature that falls outside said operating temperature range, and wherein due to the change in the shape of said member at said second temperature, said pressure that is exerted in a direction opposite to said electrodes is released.

45. A battery according to claim 37, wherein said member is made of a material that assumes one shape at said first temperature and that then assumes a different shape at a second temperature that falls outside said operating temperature range, and wherein due to the change in the shape of said member at said second temperature, pressure that is exerted in a direction opposite to said electrodes is released.

46. A battery according to claim 38, wherein said member is made of a material that assumes one shape at said first temperature and that then assumes a different shape at a second temperature that falls outside said operating temperature range, and wherein, due to the change in the shape at said second temperature, the electric connection of said positive electrodes or said positive collector to said input/output terminals for positive electrodes is interrupted, and/or the electric connection of said negative electrodes or said negative collector to said input/output terminals for negative electrodes is interrupted.

47. A battery according to claim 46, wherein a second member that is different from said member and whose shape is varied by temperature is provided, and wherein said safety valve in said battery housing is actuated as said shape of said second member is changed and a temperature at which said safety valve is actuated is raised so that said temperature is higher than said second temperature.

48. A battery according to claim 29, wherein said member is made of a material that assumes one shape at said first temperature and that then assumes a different shape at said second temperature that falls outside said operating temperature range.

49. A battery according to claim 33, wherein the altered shapes that said member assumes at said first temperature and at said second temperature are reversible.

50. A battery according to claim 29, further comprising compression uniformizing means for the uniform exertion of pressure.

51. A battery according to claim 50, wherein said compression uniformizing means is made of a material that acquires a state of flowability at a temperature that is lower than a melting point of said separators, and that does not react, or is processed so as not to react, with said solid electrolyte and said electrolyte solution.

52. A battery according to claim 50, wherein said compression uniformizing means is located between said member and said electrodes in said battery housing.

* * * * *

UNITED STATES PATENT AND TRADEMARK OFFICE
CERTIFICATE OF CORRECTION

PATENT NO. : 5,800,939

DATED : September 1, 1998

INVENTOR(S): SHINYA MISHINA ET AL.

It is certified that error appears in the above-identified patent and that said Letters Patent is hereby corrected as shown below:

COLUMN 11

Line 2, "influence" should read --influences--.

COLUMN 15

Line 19, "procedures," should read --procedures.--;
Line 20, "for example." should read --for example,--;
Line 49, "resumes" should read --resume--.

COLUMN 16

Line 22, "to be" should read --be--;
Line 63, "case" should read --housing--.

COLUMN 18

Line 48, "that gold powder" should read --that a metal, such as gold powder,--.

COLUMN 19

Line 14, "it is" should read --may be--;
Line 27, "generated-at" should read --generated at--.

UNITED STATES PATENT AND TRADEMARK OFFICE
CERTIFICATE OF CORRECTION

PATENT NO. : 5,800,939

DATED : September 1, 1998

INVENTOR(S): SHINYA MISHINA ET AL.

It is certified that error appears in the above-identified patent and that said Letters Patent is hereby corrected as shown below:

COLUMN 20

Line 32, "will" should read --does--;
Line 34, "electrolytic" should read --electrolyte--.

COLUMN 21

Line 7, "etc.." should read --etc.--;
Line 18, "case," should read --housing,--;
Line 24, "of" should be deleted.

COLUMN 23

Line 23, "case" should read --housing--;
Line 43, "preforming" should read --performing--;
Line 58, "uniformize" should read --uniformizes--.

COLUMN 24

Line 9, "that is" should read --that it--;
Line 35, "higher that" should read --higher than that--.

COLUMN 26

Line 30, "or" should be deleted;
Line 61, "Electrolytic" should read --Electrolyte--.

UNITED STATES PATENT AND TRADEMARK OFFICE
CERTIFICATE OF CORRECTION

PATENT NO. : 5,800,939

DATED : September 1, 1998

INVENTOR(S): SHINYA MISHINA ET AL.

It is certified that error appears in the above-identified patent and that said Letters Patent is hereby corrected as shown below:

COLUMN 27

Line 5, "tetraalkylanmonium" should read --tetraalkylammonium--;
Line 15, "demethylsulfide," should read --dimethylsulfide,--;
Line 16, "oxazolizine," should read --oxazolidinone,--.

COLUMN 28

Line 14, "case" should read --housing--.

COLUMN 29

Line 61, "digit" should read --digits--.

COLUMN 34

Line 3, "agent" should be deleted.

COLUMN 35

Line 59, "2-digit" should read --two digits--.

COLUMN 36

Line 32, "foamed" should read --formed--.

UNITED STATES PATENT AND TRADEMARK OFFICE
CERTIFICATE OF CORRECTION

PATENT NO. :  5,800,939

DATED        :  September 1, 1998

INVENTOR(S):  SHINYA MISHINA ET AL.

It is certified that error appears in the above-identified patent and that said Letters Patent is hereby corrected as shown below:

COLUMN 37

Line 5, "costs" should read --cost--.

COLUMN 39

Line 42, "can easily" should read --can be easily--;
Line 53, "mechanic" should read --mechanical--.

COLUMN 40

Line 27, "coupling agent" should read --binder--.
Line 44, "further" should read --further,--.

COLUMN 41

Line 5, "electrolytic" should read --electrolyte--.

COLUMN 43

Line 15, "positive said" should read --positive and said--;
Line 46, "said" should be deleted.

UNITED STATES PATENT AND TRADEMARK OFFICE
CERTIFICATE OF CORRECTION

PATENT NO. : 5,800,939

DATED : September 1, 1998

INVENTOR(S): SHINYA MISHINA ET AL.

It is certified that error appears in the above-identified patent and that said Letters Patent is hereby corrected as shown below:

COLUMN 44

Line 32, "mean" should read --means--;
Line 57, "are" should read --is--;
Line 64, "are" should read --is--.

COLUMN 45

Line 19, "electrode" should read --electrodes--.

Signed and Sealed this

Eighth Day of June, 1999

Attest:

Attesting Officer

Q. TODD DICKINSON

Acting Commissioner of Patents and Trademarks